(12) United States Patent
Brazdzionis et al.

(10) Patent No.: US 8,682,767 B2
(45) Date of Patent: Mar. 25, 2014

(54) SYSTEM AND METHOD FOR ACCESSING AND DISPLAYING DATA RELATING TO FINANCIAL SECURITIES

(75) Inventors: Paul L. Brazdzionis, Glastonbury, CT (US); Phillip A. Giancarlo, Lebanon, CT (US); James A. Serhant, II, Hadley, MA (US); Nasri Toutoungi, Fairfield, CT (US); Michael Gray, Ridgefield, CT (US)

(73) Assignee: Hartford Fire Insurance Company, Hartford, CT (US)

( * ) Notice: Subject to any disclaimer, the term of this patent is extended or adjusted under 35 U.S.C. 154(b) by 0 days.

(21) Appl. No.: 13/608,344

(22) Filed: Sep. 10, 2012

(65) Prior Publication Data
US 2013/0006891 A1 Jan. 3, 2013

Related U.S. Application Data

(63) Continuation of application No. 12/554,456, filed on Sep. 4, 2009, now Pat. No. 8,266,029.

(51) Int. Cl.
*G06Q 40/00* (2012.01)

(52) U.S. Cl.
USPC .............. 705/35; 705/36 R; 705/37; 707/795; 707/803; 707/809; 707/812

(58) Field of Classification Search
None
See application file for complete search history.

(56) References Cited

U.S. PATENT DOCUMENTS

| | | | | |
|---|---|---|---|---|
| 4,989,141 A | * | 1/1991 | Lyons et al. | 705/36 R |
| 5,220,500 A | * | 6/1993 | Baird et al. | 705/36 R |
| 5,369,778 A | * | 11/1994 | San Soucie et al. | 1/1 |
| 5,404,488 A | * | 4/1995 | Kerrigan et al. | 711/133 |
| 5,664,177 A | * | 9/1997 | Lowry | 1/1 |
| 5,890,167 A | * | 3/1999 | Bridge et al. | 1/1 |
| 5,893,079 A | * | 4/1999 | Cwenar | 705/36 R |
| 6,094,649 A | * | 7/2000 | Bowen et al. | 707/711 |
| 6,212,518 B1 | * | 4/2001 | Yoshida et al. | 1/1 |
| 6,418,400 B1 | * | 7/2002 | Webber | 703/22 |
| 6,567,814 B1 | * | 5/2003 | Bankier et al. | 1/1 |
| 6,795,868 B1 | * | 9/2004 | Dingman et al. | 709/246 |
| 6,883,087 B1 | * | 4/2005 | Raynaud-Richard et al. | 712/213 |
| 6,915,265 B1 | * | 7/2005 | Johnson | 705/2 |
| 7,013,298 B1 | * | 3/2006 | De La Huerga | 1/1 |

(Continued)

OTHER PUBLICATIONS

Cryptography and Relational Database Management Systems; Jingmin He and Min Wang; 2001 IEEE; 12 pages.

(Continued)

*Primary Examiner* — Gregory Johnson
(74) *Attorney, Agent, or Firm* — Howard IP Law Group, PC

(57) ABSTRACT

A computer system for furnishing data relating to investments has a processor and one or more memory storage devices in communication with the processor. Data relating to investments is stored in the one or more memory storage devices. A catalog includes at least data stored in at least one of the one or more memory storage devices, the data including at least logical locations for the data relating to investments. The processor is adapted to execute services for calling to the catalog for locations of the data, and, employing at least logical locations of the selected data obtained from the catalog, access the selected data from at least one of the memory storage devices, perform one or more operations on the selected data, and provide the selected data for display to a user.

20 Claims, 20 Drawing Sheets

(56) References Cited

U.S. PATENT DOCUMENTS

| | | | |
|---|---|---|---|
| 7,039,645 B1* | 5/2006 | Neal et al. | 1/1 |
| 7,133,882 B1* | 11/2006 | Pringle et al. | 1/1 |
| 7,474,330 B2* | 1/2009 | Wren et al. | 348/150 |
| 7,636,684 B1* | 12/2009 | Horowitz et al. | 705/37 |
| 8,266,029 B2* | 9/2012 | Brazdzionis et al. | 705/35 |
| 2001/0034680 A1* | 10/2001 | Purcell | 705/35 |
| 2001/0044840 A1* | 11/2001 | Carleton | 709/223 |
| 2002/0010708 A1* | 1/2002 | McIntosh | 707/500 |
| 2002/0023097 A1* | 2/2002 | Ripley | 707/200 |
| 2002/0052766 A1* | 5/2002 | Dingman et al. | 705/7 |
| 2002/0062241 A1* | 5/2002 | Rubio et al. | 705/10 |
| 2002/0091923 A1* | 7/2002 | Chipman et al. | 713/168 |
| 2003/0110055 A1* | 6/2003 | Chau | 705/1 |
| 2003/0167221 A1* | 9/2003 | Kochansky | 705/36 |
| 2003/0191667 A1* | 10/2003 | Fitzgerald et al. | 705/2 |
| 2004/0015408 A1* | 1/2004 | Rauen et al. | 705/26 |
| 2004/0128204 A1* | 7/2004 | Cihla et al. | 705/26 |
| 2004/0230605 A1* | 11/2004 | Tamboli et al. | 707/102 |
| 2004/0249800 A1* | 12/2004 | Lu | 707/3 |
| 2004/0267807 A1* | 12/2004 | Barabas et al. | 707/103 R |
| 2005/0086155 A1 | 4/2005 | Villacorta et al. | |
| 2005/0097118 A1* | 5/2005 | Slutz | 707/101 |
| 2005/0108145 A1* | 5/2005 | Kastel et al. | 705/37 |
| 2005/0273422 A1* | 12/2005 | Villacorta et al. | 705/38 |
| 2005/0283410 A1* | 12/2005 | Gosko | 705/27 |
| 2006/0080299 A1* | 4/2006 | Shimogori et al. | 707/3 |
| 2006/0106700 A1* | 5/2006 | Boren et al. | 705/35 |
| 2006/0178889 A1* | 8/2006 | Benson | 705/1 |
| 2006/0200358 A1* | 9/2006 | Ohnemus et al. | 705/1 |
| 2007/0033120 A1* | 2/2007 | Sparaggis | 705/35 |
| 2007/0150480 A1* | 6/2007 | Hwang et al. | 707/10 |
| 2007/0244783 A1* | 10/2007 | Wright et al. | 705/35 |
| 2008/0033940 A1* | 2/2008 | Dinh et al. | 707/6 |
| 2008/0103830 A1* | 5/2008 | Apacible et al. | 705/3 |
| 2008/0243715 A1* | 10/2008 | Stellhorn et al. | 705/36 R |
| 2009/0119191 A1* | 5/2009 | Stuart et al. | 705/30 |
| 2009/0271372 A1* | 10/2009 | Fife et al. | 707/3 |
| 2010/0070500 A1* | 3/2010 | Cui et al. | 707/736 |
| 2010/0106633 A1* | 4/2010 | Iyer et al. | 705/35 |
| 2010/0269674 A1* | 10/2010 | Brown et al. | 89/1.11 |
| 2010/0281004 A1* | 11/2010 | Kapoor et al. | 707/693 |
| 2010/0318472 A1* | 12/2010 | Falkenstein | 705/36 R |
| 2011/0060670 A1* | 3/2011 | Brazdzionis et al. | 705/35 |
| 2011/0261049 A1* | 10/2011 | Cardno et al. | 345/419 |
| 2013/0006891 A1* | 1/2013 | Brazdzionis et al. | 705/36 R |

OTHER PUBLICATIONS

New Architecture of Fuzzy Database Management Systems; Amel Grissa Touzi and Mohamed Ali Ben Hassine; Faculty of Sciences of Tunis, Tunisia University, Tunisia; The International Arab Journal of Information Technology, vol. 6, No. 3, Jul. 2009; 9 pages.

Automatic Integration of Relational Database Schemas; Ramon Lawrence and Ken Barker; 2000; 16 pages.

An Introduction to SAS(R) Dictionary Tables; Peter Eberhardt and Ilene Brill; 2005; 11 pages.

* cited by examiner

Fig. 4B

Surveillance - Analyst Dashboard

| Universe | Rating | Risk Class | Edit Mode | | |
|---|---|---|---|---|---|
| -- View All -- | -- View All -- | -- View All -- | Approve All | | |
| Exceptions | | | Analyst | | |
| -- View All -- | ☐ View Exceptions Only | | Dyslin | | |

Outstanding Exceptions: 10/19/2007  ○ 0  ○ 0

| Name | Ticker | Rating | Industry | Risk Class | CDS 1 Day | CDS 5 Day | CDS 30 Day | Equity Prx Vol | Short Interest | MDY Rating | MDY Watchlist | MDY Outlook |
|---|---|---|---|---|---|---|---|---|---|---|---|---|
| ASML HOLDING NV | ASML | BB | TECHNOLOGY | Market | ⊘ | ⊘ | ⊘ | | | | ⊘ | |
| AT&T INC | T | A | WIRELINES | Event | | | | | | | | |
| AVNET, INC | AVT | BBB | TECHNOLOGY | Market | ○ | ○ | | ○ | | | | |
| BANQUE DE LUXEMBOURG FOR FRANCE TELECOM | FRTEL | BBB | WIRELINES | Market | | | | | | | | |
| BELO CORP. | BLC | BBB | MEDIA_NONCABLE | Market | | | | | | | ○ | |
| BERTELSMANN AG | BERTEL | BBB | MEDIA_NONCABLE | Event | | | | | | | | |
| BRITISH SKY BROADCASTING GROUP PLC | BSY | BBB | MEDIA_NONCABLE | Market | | | | | | | | |
| BROADRIDGE FINANCIAL SOLUTIONS INC | BR | BBB | TECHNOLOGY | Market | | | | | | | | |
| BT GROUP PLC | BRITEL | BBB | WIRELINES | Event | | | | | | | | |
| CARSO GLOBAL TELECOM SA DE CV | GLOTEL | | WIRELINES | Market | | | | ⊿ | | | | |
| CBS CORP | CBS | BBB | MEDIA_NONCABLE | Market | | | | ⊿ | | | | |
| CBS CORPORATION | CBS | | MEDIA_NONCABLE | Market | | | | | | | | |
| CENTURYTEL, INC. | CTL | BBB | WIRELINES | Event | | | | | | | | |
| CHARTERED SEMICONDUCTOR MANUFACTURING, LTD. | CSMSP | BBB | TECHNOLOGY | Market | | | | | | | | |
| CISCO SYSTEMS, INC | CSCO | A | TECHNOLOGY | Market | | | | | | | | |
| COMCAST CORPORATION | CMCSA | BBB | MEDIA_CABLE | Event | | | | | ○ | | | |
| COMPUTER SCIENCES CORPORATION | CSC | A | TECHNOLOGY | Market | | | | | | | | |
| CONVERGYS CORPORATION | CVG | BBB | TECHNOLOGY | Market | | | | | | | | |
| CORNING INC | GLW | BBB | TECHNOLOGY | Market | | | | | | | | |
| COX ENTERPRISES | COXENT | BBB | MEDIA_CABLE | Event | | | | | | | | |
| DAILY MAIL AND GENERAL TRUST PLC | DMGOLN | BBB | MEDIA_NONCABLE | Event | | | | | | | | |
| DE BENEDETTI & COMPANY SAPA | CIRINT | | MEDIA_NONCABLE | Market | | | | | | | | |

HARTFORD INVESTMENT MANAGEMENT | *Credit* | Surveillance | Research | Tool Box | Issuer Maintenance | Admin | Performance

Surveillance - Analyst Dashboard

| | | | Approve All | Edit Mode | | Outstanding Exceptions | 10/19/2007 | 0 |

Universe: -- View All --  Industry: -- View All --  Rating: -- View All --  Risk Class: -- View All --  Analyst: Dyslin Exceptions: -- View All --   ☐ View Exceptions Only

| Name | Ticker | Rating | Industry | Risk Class | CDS 1 Day | CDS 5 Day | CDS 30 Day | Equity Prx Vol | Short Interest | MDY Rating | MDY Watchlist | MDY Outlook |
|---|---|---|---|---|---|---|---|---|---|---|---|---|
| ASML HOLDING NV | ASML | BB | TECHNOLOGY | Market | ⊘ | | | | | | ⊘ | |
| AT&T INC | T | A | WIRELINES | Event | | | | ⊘ | | | | |
| AVNET, INC | AVT | BBB | TECHNOLOGY | Market | | | | | | | | |
| BANQUE DE LUXEMBOURG FOR FRANCE TELECOM | FRTEL | BBB | WIRELINES | Market | | | | | | | ⊘ | |
| BELO CORP. | BLC | BBB | MEDIA_NONCABLE | Market | | | | | | | | |
| BERTELSMANN AG | BERTEL | BBB | MEDIA_NONCABLE | Event | | | | | | | | |
| BRITISH SKY BROADCASTING GROUP PLC | BSY | BBB | MEDIA_NONCABLE | Market | | | | | | | | |
| BROADRIDGE FINANCIAL SOLUTIONS INC | BR | BBB | TECHNOLOGY | Market | | | | | | | | |
| BT GROUP PLC | BRITEL | BBB | WIRELINES | Event | | | | ◁ | | | | |
| CARSO GLOBAL TELECOM SA DE CV | GLOTEL | | WIRELINES | Market | | | | ◁ | | | | |
| CBS CORP | CBS | BBB | MEDIA_NONCABLE | Market | | | | ◁ | | | | |
| CBS CORPORATION | CBS | | MEDIA_NONCABLE | Market | | | | | | | | |
| CENTURYTEL, INC. | CTL | BBB | WIRELINES | Event | | | | | | | | |
| CHARTERED SEMICONDUCTOR MANUFACTURING, LTD. | CSMSP | BBB | TECHNOLOGY | Market | | | | | | | | |
| CISCO SYSTEMS, INC | CSCO | A | TECHNOLOGY | Market | | | | | | | | |
| COMCAST CORPORATION | CMCSA | BBB | MEDIA_CABLE | Event | | | | | ⊘ | | | |
| COMPUTER SCIENCES CORPORATION | CSC | A | TECHNOLOGY | Market | | | | | | | | |
| CONVERGYS CORPORATION | CVG | BBB | TECHNOLOGY | Market | | | | | | | | |
| CORNING INC | GLW | BBB | TECHNOLOGY | Market | | | | | | | | |
| COX ENTERPRISES | COXENT | BBB | MEDIA_CABLE | Event | | | | | | | | |
| DAILY MAIL AND GENERAL TRUST PLC | DMGOLN | BBB | MEDIA_NONCABLE | Event | | | | | | | | |
| DE BENEDETTI & COMPANY SAPA | CIRINT | | MEDIA_NONCABLE | Market | | | | | | | | |

*Fig. 4D*

| HARTFORD INVESTMENT MANAGEMENT | | Surveillance | Research | Tool Box |

Credit

(No Research Selected)

Issuer: [      ] [Search]

Issuers
[ ▼ ]

Issuer Information

Issuer ID:              Risk Class:
Industry:               Equity Cusip:
Home Index:             BRS ID:
Assigned Analyst:       Ultimate Parent:

Research Submissions
No issuer selected.

Recommendations
No research submission selected

Primary Benchmark: [ ▼ ]     Expected Performance [ ▼ ]     Expected Volatility [ ▼ ]
Secondary Benchmark: [ ▼ ]                                                       [ ▼ ]

Exposure Bias: [ ▼ ]          Ratings Migration Risk: [ ▼ ]
Fundamental Trend: [ ▼ ]      Strategic Risk: [ ▼ ]
HIMCO Rating: [ ▼ ]

Research Comments
No research submission selected.

Research Documents (Only Pdf files and images) (Note: You cannot attach files larger than 4 MB (4,096 KB))
No research submission selected.

Credit Research Explorer

User: XXXXXXXX
View: Fundamental Trends and Exposure
☑ Is My Default View
View Name: Fundamental Trends and Exposure
Description:

Asset Class: • Investment Grade
  ♦ Edit ✗ Remove

-- Add Filter --

647 Issuers Matched

[New] [Save] [Save As...] [Delete...]

710 → (User/View panel)
720 → (Filter panel)
730 → Hide Criteria Panels

- ⊟ ⊖ Credit Research Explorer
  - ⊞ ☐ HIMCO Issuer Info
  - ⊟ ☐ Issuer Attributes
    - ⊞ ☐ ABC Data
    - ⊞ ☐ Company Tickers
    - ⊞ ☐ Company Names
    - ⊞ ☐ Market Data Identifiers
    - ⊟ ☐ Himco Issuer Status
      - ⊞ ☑ MNPI Status
      - ⊞ ☐ Muni Securities
      - ⊞ ☑ Public Equity
      - ⊞ ☑ Watchlist
    - ⊞ ☐ Analyst Assignment
    - ⊞ ☐ Industry Classifications
  - ⊟ ☐ Recommendations
    - ⊟ ☐ Credit Risk
      - ⊞ ☑ Fundamental Trend
      - ⊞ ☐ Himco Rating
      - ⊞ ☐ Rating Risk
      - ⊞ ☐ Strategic Risk
  - ⊟ ☐ Research
    - ⊞ ☐ Due Date
    - ⊞ ☑ Published Date
    - ⊞ ☐ Read Indicator
  - ⊞ ☐ Surveillance
  - ⊞ ☐ Issuer Analytics
  - ⊟ ☐ Exposure
    - ☐ Bank Loan
    - ☐ CASH BONDS 740 → (criteria tree)
700 → results table

| Company Name △ | MNPI Status | Public Equity | Watchlist | Fundamental Trend | Published Date | Total Exposure |
|---|---|---|---|---|---|---|
| XXXXXXXXXX | Public | No | No | | | $22,539,801.82 |
| XXXXXXXXXX | Public | No | No | Stable Credit | 1/24/2008 10:42:37 AM | $49,787,251.21 |
| XXXXXXXXXX | Public | No | No | | | $29,529,889.77 |
| XXXXXXXXXX | Public | No | No | | | $20,462,559.14 |
| XXXXXXXXXX | Public | No | No | | | $2,645,842.30 |
| XXXXXXXXXX | Public | No | No | Deteriorating Credit | 11/10/2008 4:13:44 PM | $140,080,963.35 |
| XXXXXXXXXX | Public | No | No | | | $1,765,426.50 |
| XXXXXXXXXX | Public | No | No | | | $28,093,652.03 |
| XXXXXXXXXX | Public | Yes | No | | | $499,086.55 |
| XXXXXXXXXX | Public | No | No | | | $4,419,143.46 |
| XXXXXXXXXX | Public | No | No | | | $62,429,547.98 |
| XXXXXXXXXX | Public | No | No | | | ($629,828.73) |
| XXXXXXXXXX | Public | No | No | | | $38,413,300.00 |
| XXXXXXXXXX | Public | No | No | Deteriorating Credit | 2/3/2009 9:46:11 AM | $22,603,970.49 |
| XXXXXXXXXX | Public | No | No | | | $27,157,792.69 |
| XXXXXXXXXX | Public | No | No | | | $50,427,247.11 |
| XXXXXXXXXX | | | | | | $1,408,913.48 |
| XXXXXXXXXX | Public | No | No | Deteriorating | 1/12/2009 | $73,145,570.31 |

*Fig. 7*

HARTFORD *Credit* | Surveillance | Research | Tool Box | Issuer Maintenance | Admin | Performance

Surveillance - Issuer Event Analysis

ASML Holding NV
- Ticker: ASML
- BRS Id: 1234
- Moody's Rating: BB
- S & P Rating: BB
- Exposure: $99M
- Analyst: Dyslin
- Risk Class: Market ▽ Recent Results - 10/07/2007

| | | | | |
|---|---|---|---|---|
| CDS Movement (1 Day) | −5% ▽ 95 | Ref ▽ 100 | +5% ▽ 105 | Subject ▽ 109 | — 810 View Chart |
| CDS Movement (5 Day) | −5% ▽ 95 | Ref ▽ 100 | Subject ▽ 103 | +5% ▽ 105 | — 812 View Chart |
| CDS Movement (30 Day) | −5% Subject ▽ 96 | Ref ▽ 100 | +5% ▽ 105 | — 814 View Chart |
| Moody Rating | Ref ▽ BB+ | | Subject ▽ BBB− | — 816 View Comments |
| S & P Rating | Subject ▽ BB+ | | Ref ▽ BBB− | — 818 View Comments |

▽ Event History  [60 Day ▽]

△ 08/07/2007  ☐ Rule Recalibrated - CDS Movement (Day)
△ 08/08/2007  ○ CDS Movement (1 Day) ✎
△ 09/15/2007  ○ Moody's Watchlist
△ 09/30/2007  ○ Moody's Rating
△ 10/01/2007  ○ Risk Class Change (system)

*Fig. 8*

SYSTEM AND METHOD FOR ACCESSING AND DISPLAYING DATA RELATING TO FINANCIAL SECURITIES

CROSS-REFERENCE TO RELATED APPLICATIONS

This application is a continuation of co-pending U.S. patent application Ser. No. 12/554,456, entitled System and Method for Managing Data Relating to Investments from a Variety of Sources, filed Sep. 4, 2009, the entire contents of which are incorporated herein by reference for all purposes.

FIELD OF INVENTION

The present invention relates to computer systems, and particularly to computer systems for use in the financial services field for obtaining, displaying and evaluating data related to investments.

BACKGROUND

In the field of financial services, investment managers require current data regarding risks associated with investments in order to manage their portfolios and portfolios of their clients. Analysts review a wide variety of information from a wide variety of sources in order to assess such risks. Such sources include a variety of data services available from a variety of providers. Analysts provide their own analyses and reports. Analysts have available a wide variety of information in various formats, as well as information and analyses that they and their colleagues have generated. The volume and variety of information available renders the review of all relevant information relating to investments time-consuming for the analyst.

SUMMARY

In one embodiment, a computer system for accessing, retrieving, analyzing and displaying data related to financial securities includes a processor and a memory storage device in communication with the processor. The processor is adapted to: access, responsive to instructions received via one of a plurality of services, the services providing at least charting and analytics of data, a memory storage device having a catalog including at least logical locations of data related to issuers of the financial securities; employ location data accessed from the catalog to access the data related to the issuers; transform the accessed data into a data structure compatible with the one of the plurality of services; and, in accordance with the one of the plurality of services, select and process the transformed data and provide an output signal for display of the transformed data on the display.

In an embodiment, a computer system for furnishing data relating to investments has a processor and one or more memory storage devices in communication with the processor. Data relating to investments is stored in the one or more memory storage devices. A catalog includes at least data stored in at least one of the one or more memory storage devices, the data including at least logical locations for the data relating to investments. The processor is adapted to execute services for calling to the catalog for locations of the data, and, employing at least logical locations of the selected data obtained from the catalog, access the selected data from at least one of the memory storage devices, perform one or more operations on the selected data, and provide the selected data for display to a user.

In an embodiment, a computer-implemented method for furnishing data relating to investments includes accessing by a processor, in accordance with instructions from one of a plurality of services, a catalog including at least catalog data stored in at least one or more memory storage devices, the catalog data including at least logical locations for the data relating to investments; employing location data accessed from the catalog, accessing by the processor selected data of the data relating to investments stored in one or more memory storage devices; and performing by the processor in accordance with the instructions from the one of the plurality of services, one or more operations on the selected data and providing an output signal for display of the selected data on a user-accessible display device.

In an embodiment, a computer-readable medium has instructions thereon for furnishing data relating to investments, which instructions, when executed by a processor, cause the processor to: access a catalog including at least catalog data stored in at least one or more memory storage devices, the catalog data including at least logical locations for the data relating to investments; employ location data accessed from the catalog to access selected data of the data relating to investments stored in one or more memory storage devices; and perform in accordance with instructions from one of a plurality of services, one or more operations on the selected data and provide an output signal for display of the selected data on a user-accessible display device.

BRIEF DESCRIPTION OF THE FIGURES

FIGS. 4A-4D are exemplary screen shots in an embodiment of a system of the invention providing an analyst with data regarding numerous issuers.

FIGS. 5A-5C are exemplary screen shots in an embodiment of a system of the invention providing an analyst with opportunities to input analyses.

FIG. 7 is an exemplary screen shot in an embodiment of a system of the invention showing a display for selecting and displaying issuer data.

FIG. 8 is an exemplary screen shot in an embodiment of a system of the invention showing graphical displays of issuer data against surveillance rules.

DETAILED DESCRIPTION

It is to be understood that the figures and descriptions of the present invention have been simplified to illustrate elements that are relevant for a clear understanding of the present invention, while eliminating, for the purpose of clarity, many other elements found in typical computer systems and methods for obtaining, classifying, displaying and processing data related to investments. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein.

Figure 1:
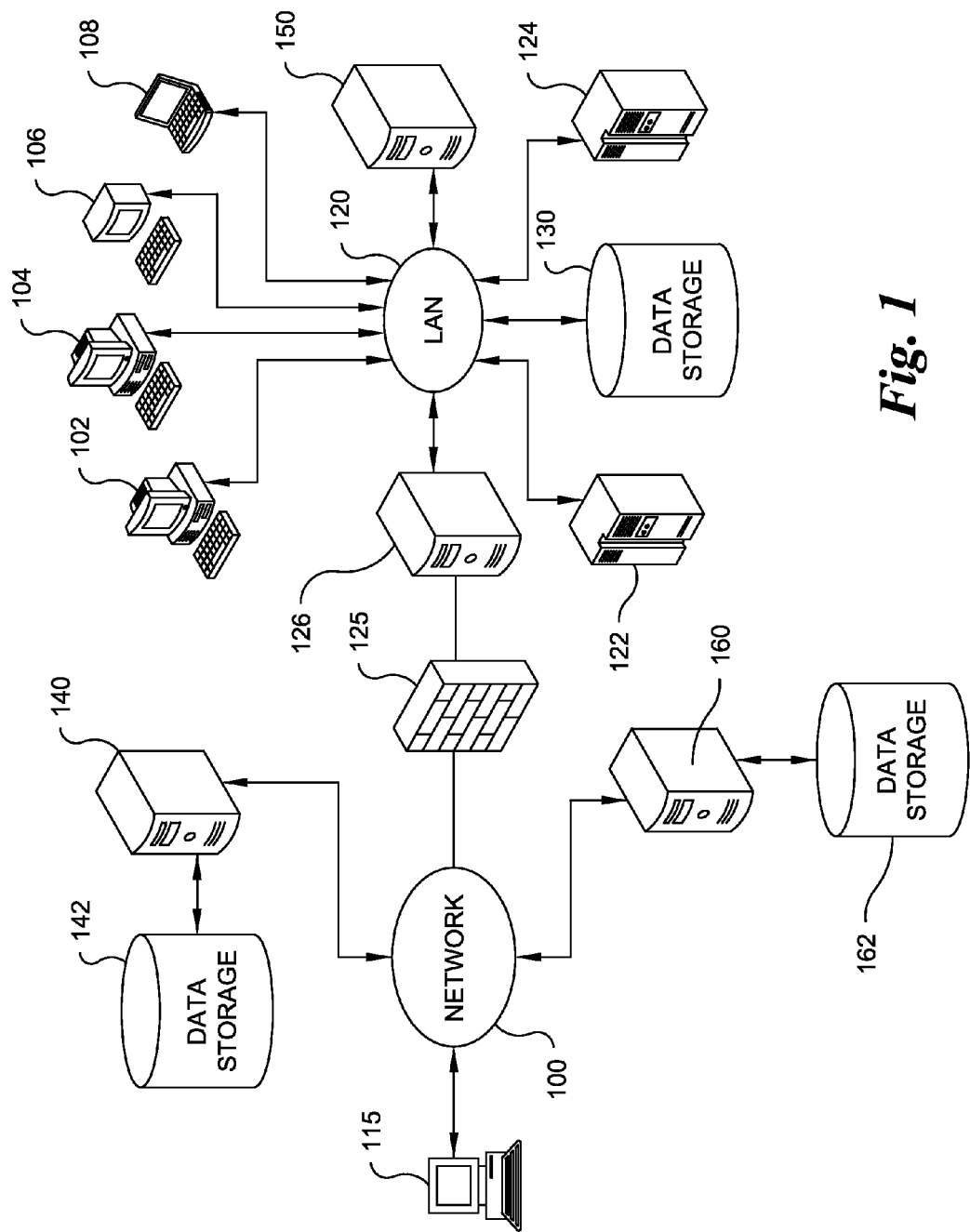
FIG. 1 is a schematic diagram of an exemplary computer network for implementation of a method and system of the invention.

Referring to FIG. 1, an exemplary network configuration is shown. Computer system 150, which may be implemented on server hardware, may implement a system and method of providing data related to investments, as well as for accessing data in a variety of formats from more than one data source, cataloging accessed data, analyzing accessed data, and making data available to users. Computer system 150 communicates via LAN 120 with various other computer systems and devices over an entity's system, all in communication with network 100 via firewall unit 125 and server 126. Firewall unit 125 may be a standalone device with processor(s) and memory to provide virus checking, user authentication and other firewall and security services. Server 126 may perform services such as routing of traffic, authentication and verification services, and other network-related services. Network 100 connects various computer systems and devices. Network 100 may be or include any type of network, including a local area network (LAN), a wide area network (WAN), an intranet, the Internet, a public switched telephone network (PSTN) or other network. Network 100 may employ any suitable data protocols.

Client devices 102, 104, 206, 108 are in communication with system 150 via LAN 120. Client devices 102, 104 are exemplary desktop personal computers; client device 106 is exemplary of a terminal; client device 108 is a notebook. The client devices are user-accessible. Depending on the category of user employing a client device, the client device may service as an analyst client device, a trader client device, a researcher client device, or an administrator client device, by way of non-limiting examples. Any suitable computer system, terminal or device may be provided, including personal digital assistants, smart phones and other devices. Users employing client devices may, after being authenticated, access system 150.

System 150 may be configured having a processor that is adapted to, configured to or configurable to receive data, such as requests for data relating to investments. System 150 may maintain a catalog relating identifications of investments, including issuers and securities, in various data formats and sources to identifications of the same issuers and securities in other data formats and sources. Data related to investments may include data related to investments other than securities; by way of non-limiting example, investments may include real estate and rights in real property, commodities and rights in commodities, rights in personal property, such as art and antiques. Data relating to investments may also include data related to a portfolio of investments, such as data identifying investment holdings of an investor, an investment manager, or other individual or entity. Data relating to investments may also include data that may affect investments, such as macroeconomic data, such as gross domestic product, prices and wages, employment, interest rates, new business starts, bankruptcies, and other indicators of economic activity. Data related to investments may include data related to particular markets or industry areas that may be of interest with regard to investments. Data related to investments may include data in text form, such as articles in newspapers, magazines and other print or electronic publications.

In response to a request received from an authenticated user employing one of client devices 102, 104, 106, 108, for data relating to investments, such as data relating to an issuer or a security identified by the user, system 150 may access data related to investments, such as data specifically relating to the identified issuer or security from one or more sources of data. System 150 may access data defining a catalog prior to accessing data from additional sources of data. The multiple sources of data may include data in different data formats. By way of example, system 150 may access, via LAN 120, data in local sources of data. Local sources of data may include databases associated with mainframe systems 122, 124 and data storage 130. System 150 may access, via LAN 120, firewall 125, and network 100, third party servers 140, 160, which respectively may permit system 150 to access data in data storage 142, 152. System 150 may receive data from the various internal and external sources in various formats, and catalog the received data as well as store the data in a common data structure. The data in a common data structure may be stored in local memory devices of system 150, in data storage 130, or in one or more other computer-accessible memory devices accessible to system 150. System 150 may return responses to client devices 102, 104, 106, 108.

In embodiments, a network or data processing network, such as network 100, may be employed which may include a plurality of individual networks, such as a wireless network and a landline based network, each of which may include a plurality of servers, individual workstations or personal computers. Additionally, as those skilled in the art will appreciate, one or more LANs may be included where a LAN may comprise a plurality of intelligent workstations coupled to a host processor. The networks may also include mainframe computers or servers, such as a gateway computer or application server. A gateway computer serves as a point of entry into each network. The gateway may be preferably coupled to another network by means of one or more communications links. The gateway may also be directly coupled to one or more workstations using a communications link. The gateway may also be coupled to storage devices for storing data related to investments. Further, the gateway may be directly or indirectly coupled to one or more workstations. Those skilled in the art will appreciate that the gateway computer may be located geographically remote from the network, and similarly, the workstations may be located geographically remote from the networks and/or network servers. The client devices or workstations may connect to the wireless network using a networking protocol such as the Transmission Control Protocol/Internet Protocol ("TCP/IP") over a number of alternative connection media, such as cellular phone, radio frequency networks, satellite networks, etc. The wireless network may connect to the gateway using a network connection a such as TCP (Transmission Control Protocol) or UDP (User Datagram Protocol) over IP, X.25, Frame Relay, ISDN (Integrated Services Digital Network), PSTN (Public Switched Telephone Network), etc.

Figure 2:
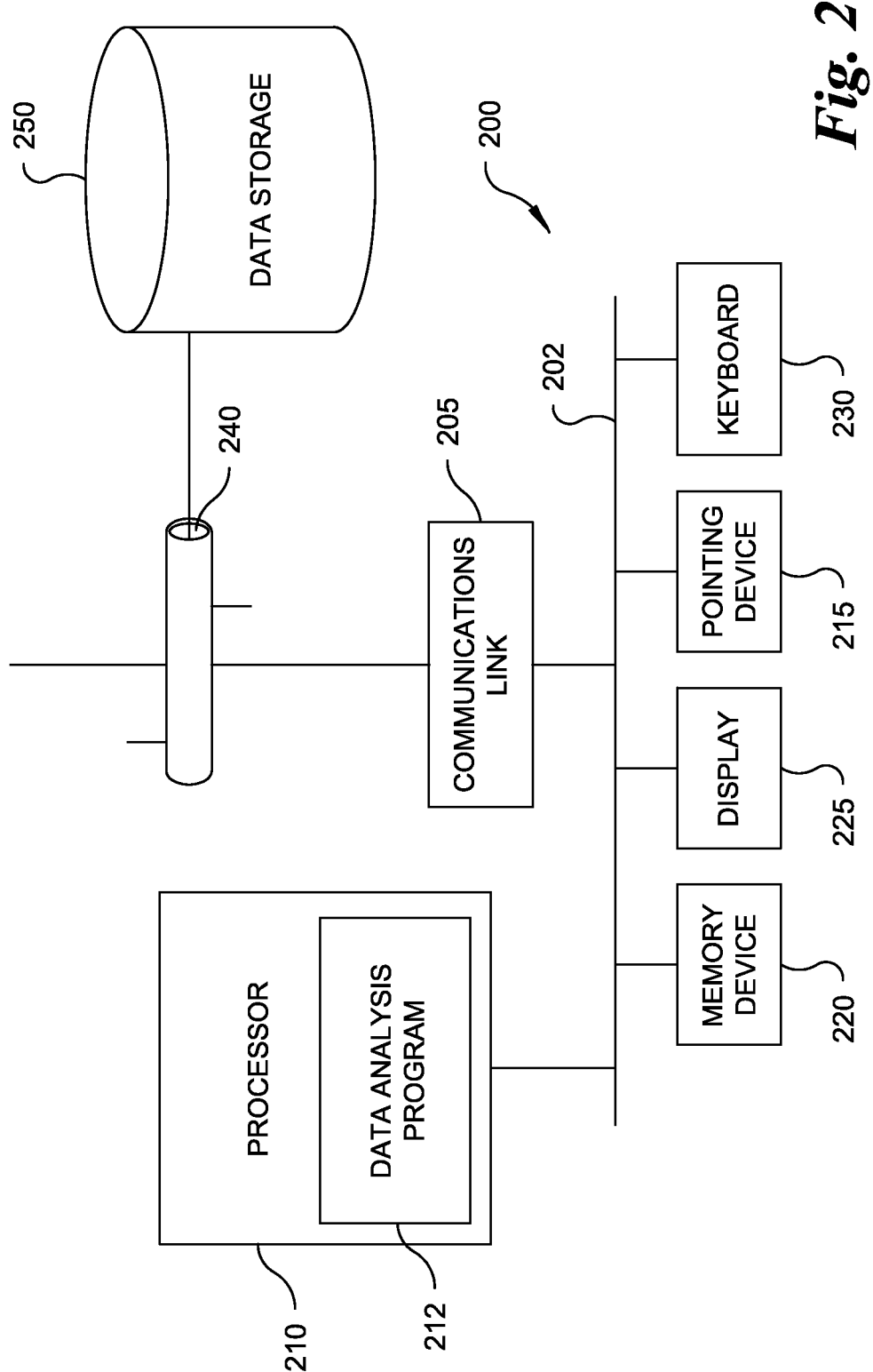
FIG. 2 is a schematic diagram of a computer system, which may be integrated in the network of FIG. 1, for implementation of a method and system of the invention.

Referring now to FIG. 2, a schematic diagram illustrates an exemplary computer system for use in the embodiment of FIG. 1. In computer system 200, processor 210 executes instructions contained in programs such as data analysis program 212. Programs may be stored on suitable media, such as optical or magnetic disks, fixed disks with magnetic storage (hard drives), tapes accessed by tape drives, and other storage media. Processor 210 communicates, such as through bus 202 and/or other data channels, with communications port 205 and memory device 220, receives data from user inputs such as touch screens, pointing device 215 and keyboard 230, and provides data to outputs such as display 225, sound cards driving speakers, and printers. Processor 210 may provide data in the form of signals, such as through bus 202 and/or other data channels. Memory device 220 is configured to exchange data with processor 210, and may store programs containing processor-executable instructions, and values of variables for use by such programs. In an embodiment, inputs may include user interfaces, including workstations having keyboards, touch screens, pointing devices such as mice, or other user input devices, connected via networked communications to processor 210. By way of non-limiting example, one or more programs may cause outputs 225 to display data received in response to requests for investment data to human operators. Communications port 205 may communicate via LAN 240 with remote sources of information, and with systems for implementing instructions output by processor 210. LAN 240 is merely exemplary, and communication may be by one or more of suitable communication methods, including over wired or wireless local area networks and wide area networks, and over communications between networks, including over the Internet. Any suitable data and communication protocols may be employed. Data storage 250, which may include a wide variety of data acquired and processed in accordance with embodiments, is accessed by processor 210 via LAN 240.

Figure 3:
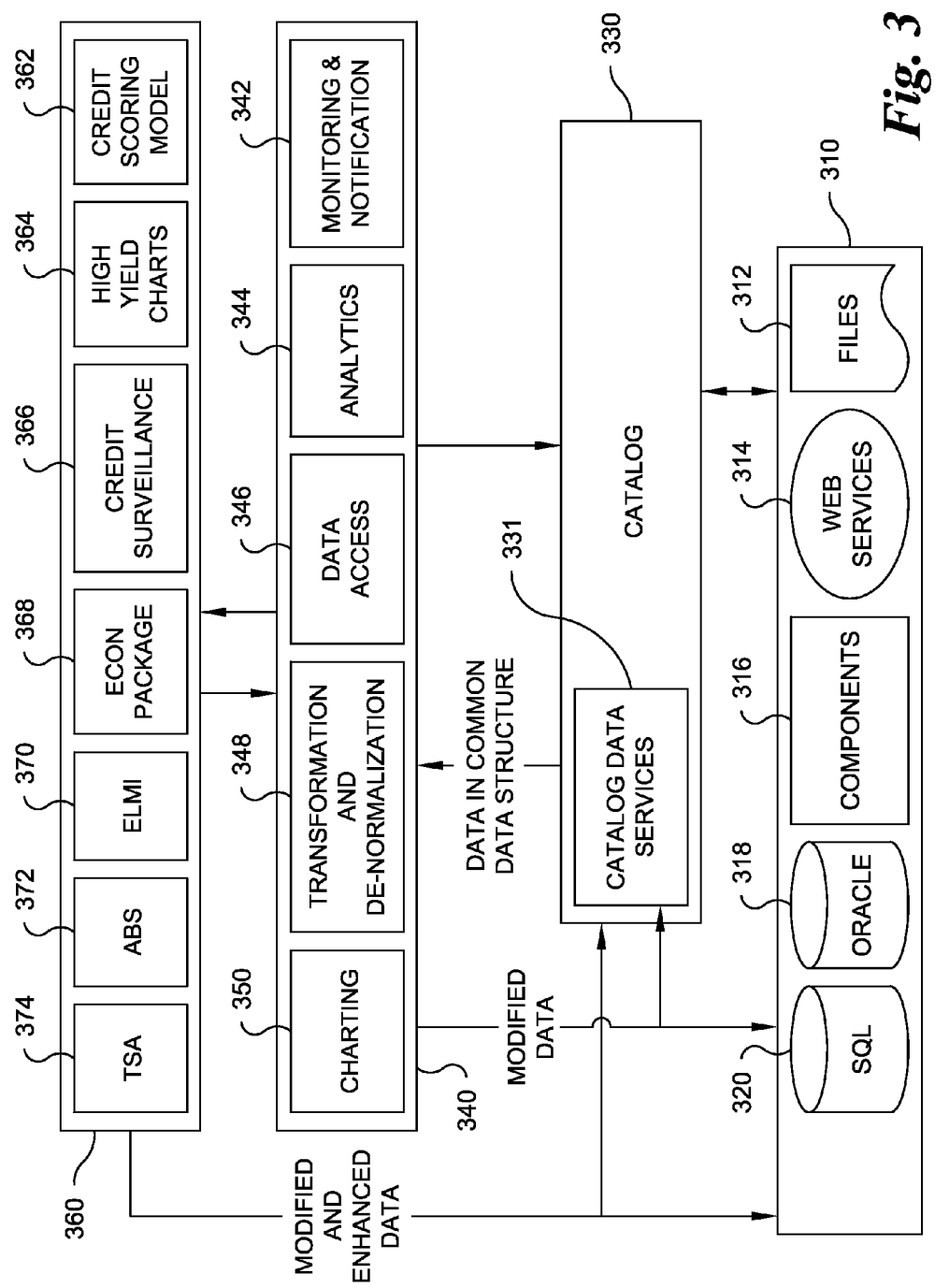
FIG. 3 is a schematic diagram showing elements in a system for implementation of the invention.

Referring to FIG. 3, a schematic representation of elements of a system in accordance with an embodiment is illustrated. Exemplary sources 310 of data are shown. Sources 310 are illustrative of sources of data in differing formats. For example, data may be stored in flat files, such as files 312. Flat files may include data in spreadsheet format and tables in various software formats. Data may be accessible via web services 314, which may access and return data from using suitable credentials over the Internet, corporate intranets and other networks. Data may be accessed from components 316. Data may be accessed from databases using various formats, such as Oracle databases 318 and SQL protocol databases 320.

Catalog 330 is defined by data which provides interrelationships of data from the variety of different data sources. For example, catalog 330 may include, for a given investment, such as a security issued by a particular issuer, addresses and credentials for variety of databases having data regarding that security, identification of types of data in different data sources, identification of handles for the security in the various data sources, and identification of resources and types of data relevant to the issuer of the particular security, by way of non-limiting example. Catalog 330 may be implemented in a relational database program executed on a processor and storing and accessing data in a memory device. Catalog 330 may provide a mapping function to map related data across different physical and logical representations and addresses as well as different data formats. Catalog 330 has associated therewith catalog data services 331. Catalog data services 331 may determine, based on a call from a service, a suitable data structure in which to provide the requested data, and furnish the requested data from the data sources. Catalog data services 331 may transform data from a format in which the data is stored in a source 310 to one of various common data structures accessible to services in services layer 340.

Catalog data services 331 may access and convert data in real time in response to a request from a service. Examples of common data structures include a collection of arrays, indexed by a suitable key structure. A collection of arrays may also be referred to as a matrix. In such a key structure, an example of a key set is a set of identifiers, each of which is unique and associated with an issuer of securities. As is understood by those in the art, arrays are ordered in a manner that can correspond to key sets. It will be appreciated by those of skill in the art that such data structures are supported by almost any programming language or development tool.

Services layer 340 illustrates exemplary services that may be called in connection with requests for data. A "service" means a functionality provided by software, when instructions provided by the software are executed by one or more processors. The functionality provided by a service may be provided when instructions stored on computer-readable media are accessed by a processor and executed by the processor. The data is maintained in a common data structure compatible with and accessible to the services without a need for further transformation or translation of data. The services in services layer 340 may include instructions that cause a processor to access catalog 330, employ data obtained from catalog 330 to access data sources 310, perform operations on the accessed data, and furnish the accessed data to applications, which in turn present the data to users. Examples of operations performed on the data may include, by way of non-limiting example, comparisons to reference values and tolerance limits, statistical analyses, summaries, and formatting in reports.

Services may be invoked by users directly, or may be invoked by applications that are accessed by users. Monitoring and notification service 342 is adapted to receive thresholds of parameters, access data including those parameters on a periodic basis, and provide flags and notifications for users when those thresholds are breached. Analytics service 344 performs a variety of analyses on received data. These analyses may include a variety of statistical analyses related to securities. Data access service 346 may provide functionality related to accessing sources of data 310. Transformation and denormalization service 348 operates on received data to provide consistency in data format and nomenclature. In the financial services field, there are numerous different and incompatible data formats used exclusively by entities in the financial services field. Accordingly, transformation and denormalization services are advantageous. Once data has been transformed and denormalized, the data may be stored in a transformed data format that is accessible to other services. The transformed data is also represented in the catalog as to logical and/or physical representations. Charting service 350 provides graphical tools for display of data.

Applications 360 include individual software tools or applications that may be selected by users of the system. Applications 360 may run on client devices. As noted above, applications 360 may invoke services in services layer 340. Applications 360 may provide a user output in the form of accessed and processed data displayed on a single screen. User interactions with applications 360 may permit users to access and view data, perform statistical analyses on data, obtain selected visualizations or presentations of data, create rules for notifications related to the data, and receive notifications based on rules. User interactions with applications 360 may further permit users to design and create packages of data, such as for periodic delivery to users, and may include data indicative of quality assessment of data for a package, contents of a package, manner of presentation of data, and storage of historical presentations of data in the package. Applications 360 may be implemented as instructions stored on computer-readable media which, when executed by a processor, cause the processor to perform a series of steps. Credit scoring model 362 includes rules for selecting data related to creditworthiness of issuers and providing summaries of creditworthiness. High yield charts 364 include rules for accessing data regarding particular securities and generating charts or other graphic displays. Credit surveillance tool 366 includes rules for accessing data regarding securities, data related to those securities and comparisons of data related to those securities to thresholds. Credit surveillance tool 366 is explained in greater detail below with reference to FIGS. 4A-4D. Economic package 368 accesses macroeconomic data and may present the data as a series of charts. Users may select how to group and distribute the data within charts, for example, ELMI (Emerging Local Markets Index) 370 is a quantitative model application that accesses data regarding emerging markets and provides analyses and displays of data concerning emerging markets. ABS (Asset Backed Securities) 372 is a program that accesses data concerning asset backed securities and can provide user-configurable charts for data related to asset backed securities. TSA 374 refers generally to time-series analytics functionality. The applications noted in FIG. 3 are merely exemplary. In an embodiment, users interact with applications 360, which call services 340, which in turn employ catalog 330 to identify locations and nomenclature of data and access data sources 310 using the locations and nomenclature from the catalog. Modified data is returned by services in services layer 340 to data sources 310. Data that has been modified, and may have been enhanced by users accessing applications, may be returned by applications 360 to data sources 310. Data relating to the locations of the modified and/or enhanced data is provided to catalog 330 and incorporated in the catalog 330.

Figure 4A:
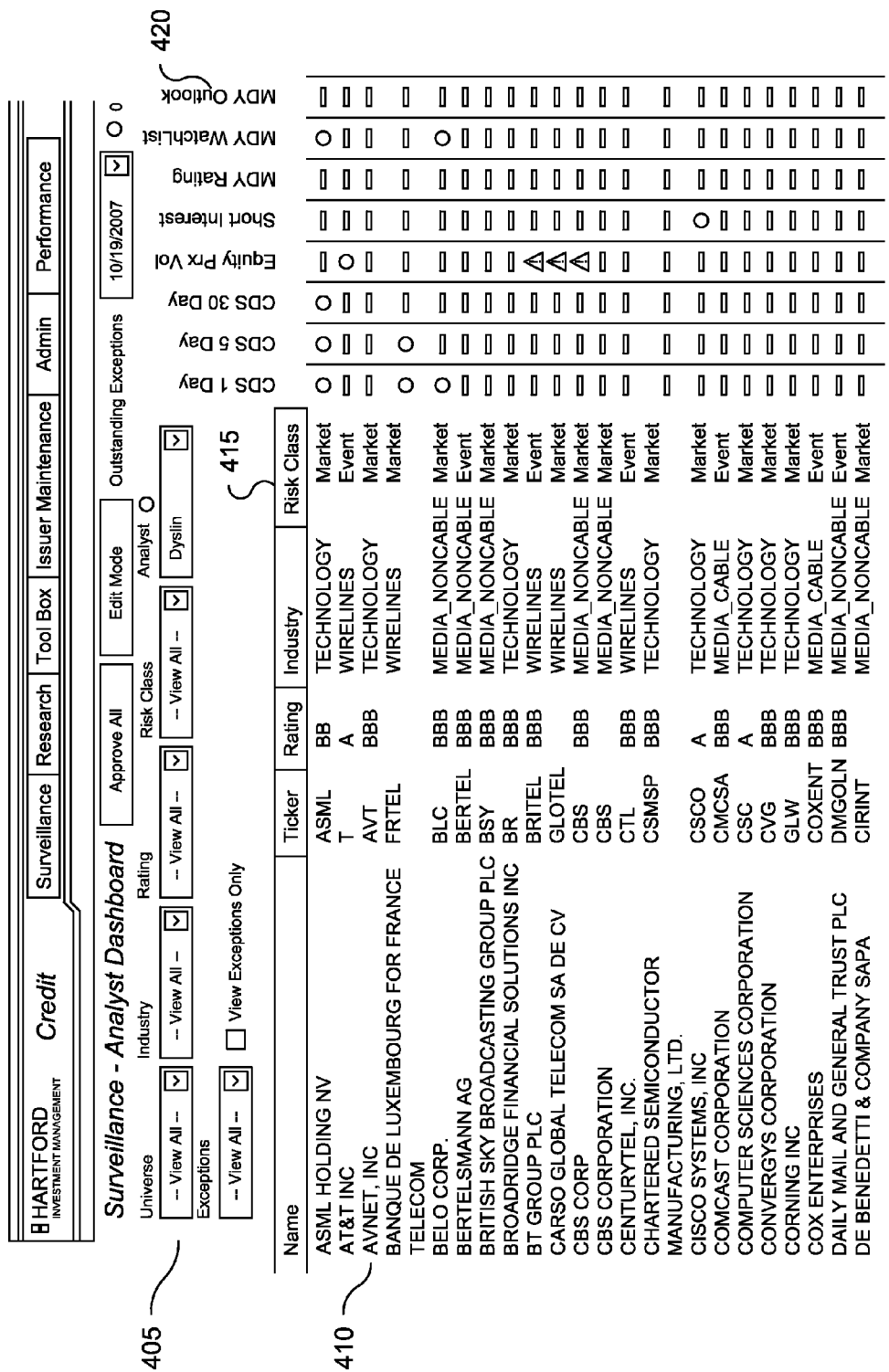

Referring now to FIG. 4A, an exemplary display for an analyst using a credit surveillance application, such as credit surveillance application 366 of FIG. 3, will be explained. A user may log in and be authenticated. Filtering options 405 related to various criteria associated with issuers are provided; in this embodiment, filtering options are provided as drop down menus. Each issuer 410 identified responsive to a filter is listed; in this embodiment, displayed data includes a name, ticker symbol, debt rating, and industry classification. Risk class 415 are those associated with a particular event or with reference to market performance. Various criteria that may have surveillance rules associated therewith are shown at 420. Examples of criteria include: credit default swap 1 day variation, credit default swap 5 day variation and credit default swap 30 day variation. As explained in greater detail below, thresholds are provided with respect to each of these rules. For each listed issuer, the criteria are all listed, and, as to each criterion, the display provides an indication, such as a suitable icon, as to whether or not there is an exception, i.e., a threshold that has been passed. Those criteria for which there is an error, such as the unavailability of data, are also noted. The display indicates the result of application of the surveillance rules to each criterion. The underlying data for the criteria are obtained from the various data sources, and application of surveillance rules may be performed by the various services. The display shown in FIG. 4A highlights for the analyst those issuers that may require additional research.

Figure 4B:
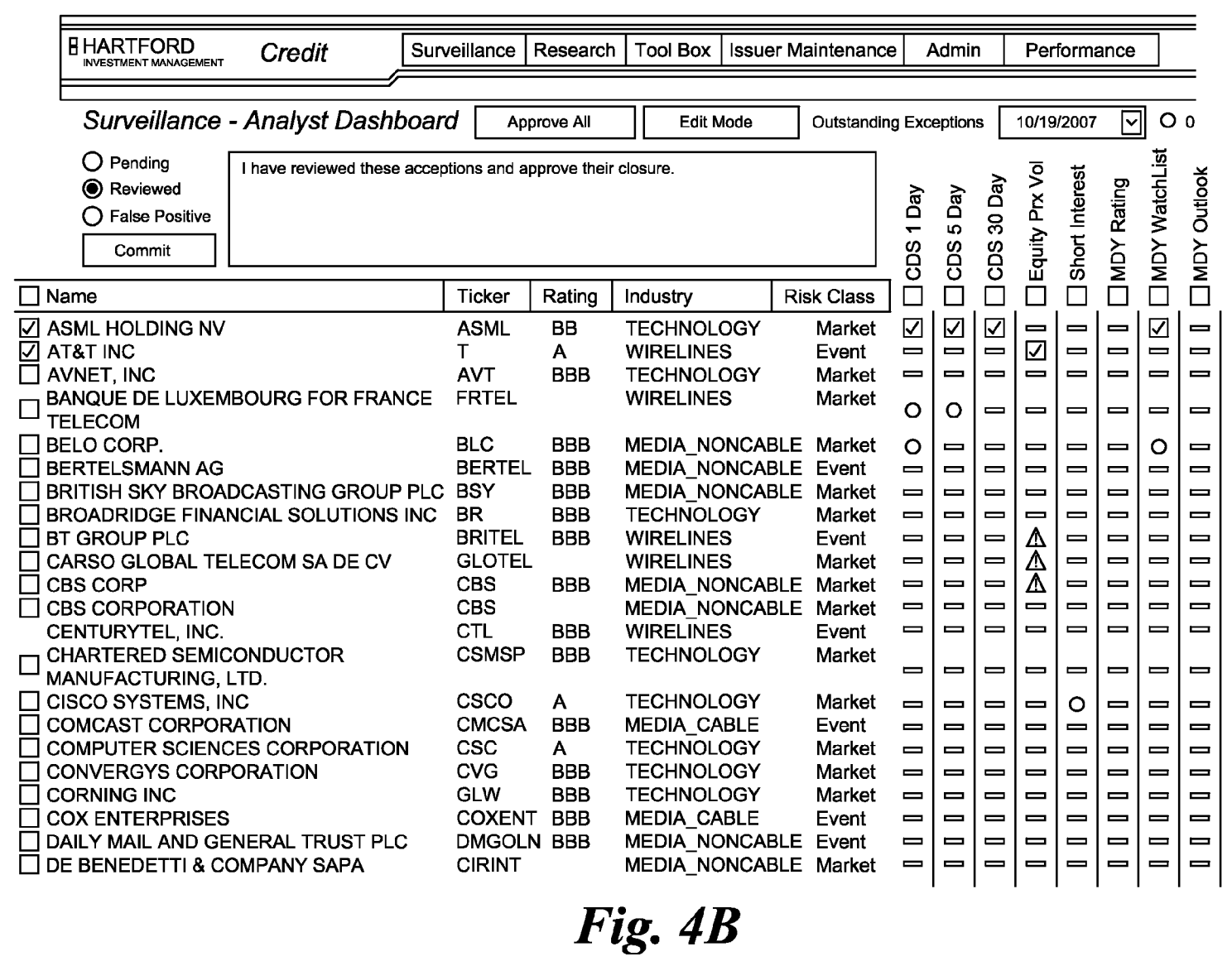

Referring now to FIG. 4B, the analyst may select edit mode. In edit mode, the analyst may enter data with respect to the exceptions, such as identifying the exceptions as false positives, or closing the exceptions as not being of concern. It will be understood that in this edit mode a system processor is adapted to receive from the user at the client device an indication of review and closure of one or more exceptions. Moving to FIG. 4C, the exceptions that have been reviewed are identified after the analyst leaves edit mode, and the exceptions that are still in need of analyst review remain identified. It will be understood that this display is generated by a system processor responsive to an indication of review and closure of an exception. This display of FIG. 4C graphically displays, in association with the issuer and the rule, an icon which serves as an indication of a reviewed exception, such as at 425. Referring to FIG. 4D, all exceptions have been reviewed, and a graphical display indicative of review is associated with each exception.

Figure 5B:
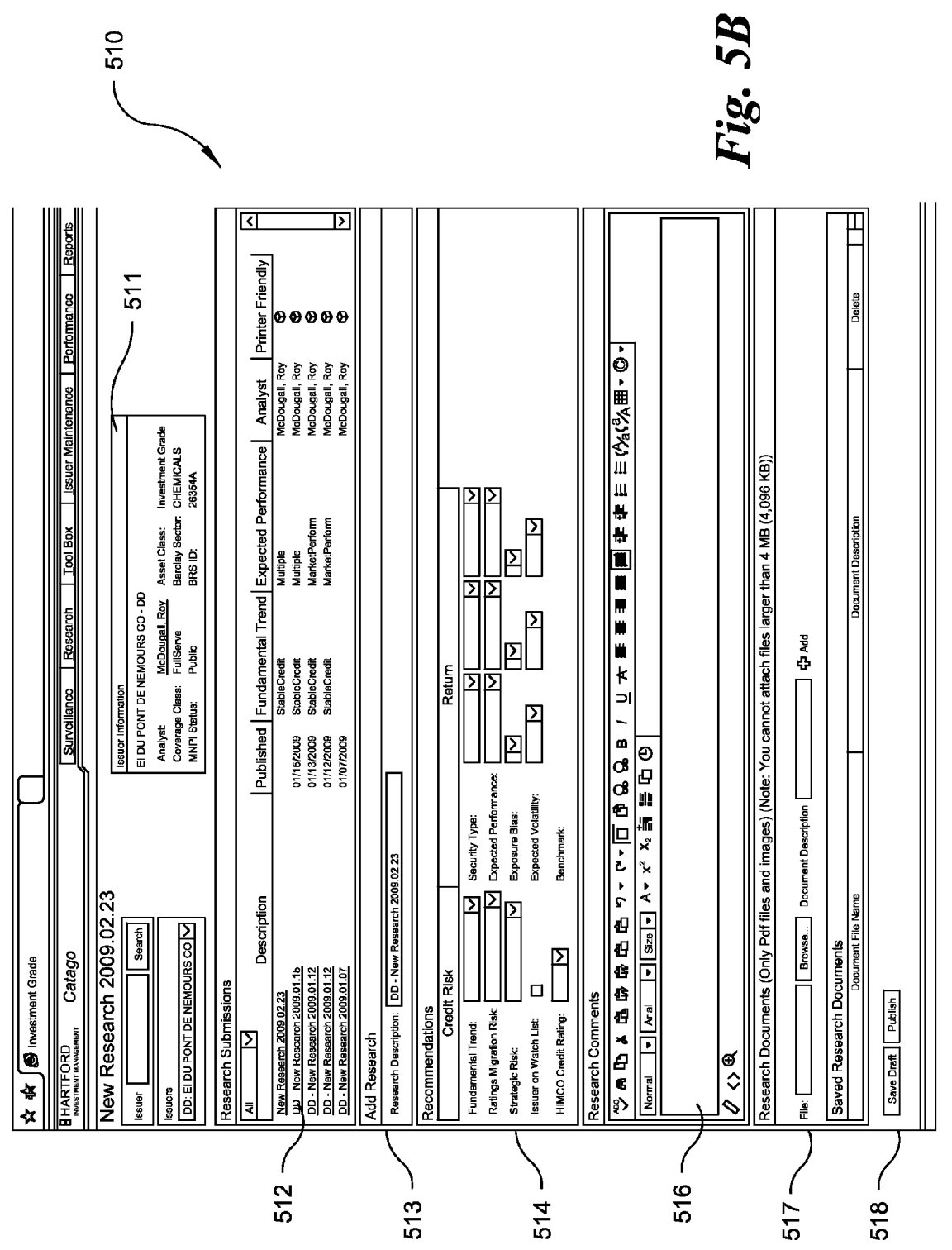

Referring now to FIG. 5A, a credit research functionality will be explained. Display 502 is a screen presented to a researcher for searching in a database of issuers. Display 502 shows an input field that serves to prompt the user for issuer identification. A system receives issuer identification information from the user and identifies an issuer. Referring now to FIG. 5B, the system then retrieves data concerning the identified issuer, which is presented in display 510. Display area 511 provides a summary of retrieved data concerning the issuer. Exemplary retrieved data includes name of the issuer, the name of an analyst responsible for following the issuer, a coverage class, which may indicate the intensity of coverage of the issuer, whether there is material nonpublic information (MNPI) concerning the issuer in the system, an asset class, a sector and an identification number. The research submissions area 512 displays a listing of internal research reports for the issuer. Links are available to the reports. A table is provided of data relative to the reports and issuer data associated with each of the reports, including a fundamental trend value and an expected performance value. An add research area 513 permits an analyst to include new research. A recommendations area 514 permits an analyst to input for inclusion in a database recommendation data, including, by way of example, values of variables relating to such issues as credit risk for the issuer, and return for individual securities of the issuer. Drop down lists may be provided to permit selection of permitted values for the variables. The variables may include trend data, ratings migration risk, strategic risk, investment manager credit ratings and whether the issuer is on a watch list. Multiple security types may be input, and variables including expected performance, exposure bias and expected volatility may be provided. A benchmark may be selected for comparison of variations in value.

Display area 516 permits an analyst to input text employing a text editor or using a word processing application. The text may include, by way of example, recommendation data, or any other data or commentary relating to the issuer or security. Area 517 permits an analyst to attach documents to associate with a research report. An analyst may choose to save research for later review at 518, such as by selecting a DRAFT option, represented in FIG. 5B as a radio button. If the analyst provides an indication that the research is to be saved for later review, by selecting the DRAFT option, the processor may designate that the research is not to be made available to other users of the system, or otherwise make the research saved for later review to be published by the system. The draft research or draft research recommendation may be associated in the catalog with the issuer, but access to the draft research or draft research recommendation may be submitted to the analyst. The research data upon publication is referenced in catalog 330 of FIG. 3 for access by users of the system. For example, the documents attached by the analyst and text created by the analyst are associated with the issuer in catalog 330.

Figure 5C:
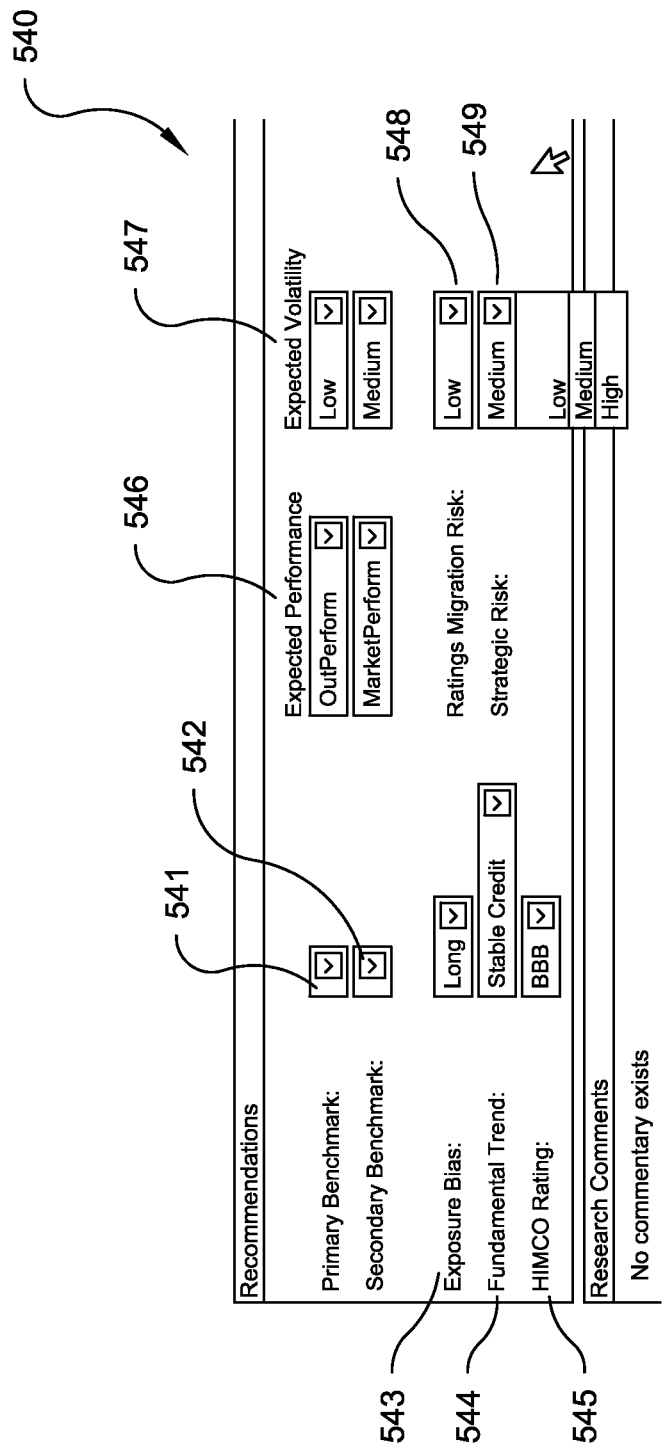

Referring to FIG. 5C, a screen shot is shown of recommendations area 540 which permits an analyst to provide recommendation data with regard to a security. An analyst may access drop down menus permitting display and selection of values associated with certain variables. In this example, an analyst may select values for a primary benchmark 541 and a secondary benchmark 542. Values for exposure bias 543, a trend 544, and an internal rating 545 may be selected. Values for expected performance 546 and expected volatility 547 may be selected relative to each selected benchmark. Values for rating migration risk 548 and strategic risk 549 may also be selected.

Figure 6:
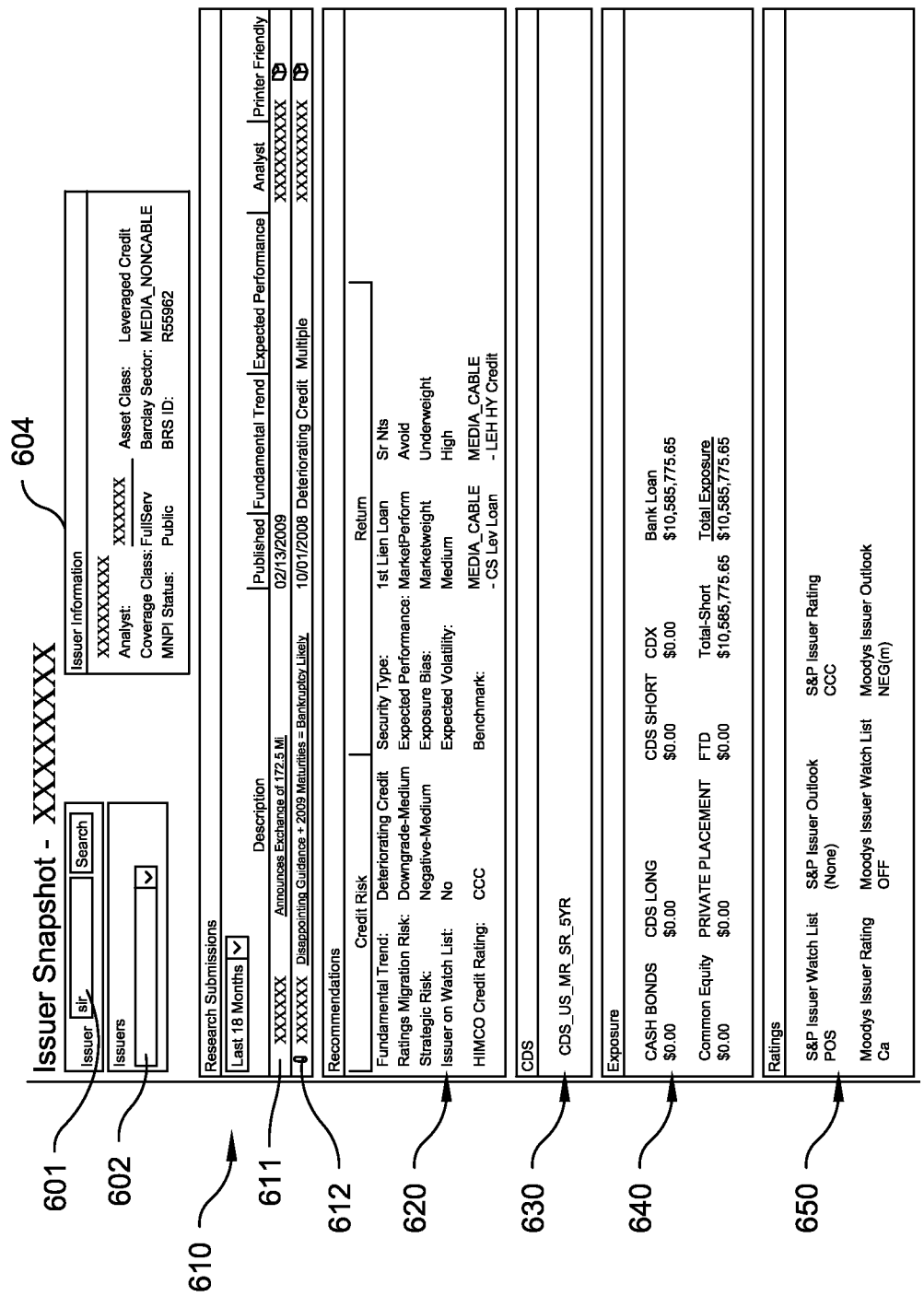
FIG. 6 is an exemplary screen shot in an embodiment of a system of the invention showing a display summarizing available data relating to an issuer.

Referring now to FIG. 6, display 600 is shown representing an issuer snapshot screen that displays collected data relating to an issuer. It will be appreciated that display 600 may be created by a processor executing instructions performed by one or more services, obtaining from a catalog location data as to selected data relating to investments, employing the location data to access the selected data relating to investments, transforming the selected data into a common data format, performing operations on the transformed data, and providing an output signal including data for display of the transformed data. Display 600 is available to system users and not merely to analysts. An issuer may be selected through a search input 601 or a drop down menu 602. Issuer information box 604 displays selected summary information regarding the selected issuer. Research submission display section 610 displays research reports prepared by analysts and other documents associated by analysts with the issuer. For example, article 611 is an example of an existing document associated by an analyst with the issuer. Report 612 is an analyst report; values of variables input by the analyst, namely trend and expected performance values, are displayed.

Recommendations section 620 shows the current values of selected variables relating to the issuers as input by an analyst into the system. Credit default swap section 630 identifies credit default swaps related to risks of default by the issuer. Exposure section 640 displays certain data related to holdings by an entity. For example, the data could include funds held by an entity itself or by an investment manager on behalf of its clients. The holdings data may be segregated by various categories. In this example, the categories are cash bonds, credit default swap long positions, credit default swap short positions, credit default swap index, bank loans, common equity, private placement equity, first to default notes, and subtotals and totals of categories. Ratings section 650 provides identifications of various commercial ratings of the issuer and values of those ratings.

Referring now to FIG. 7, a method for permitting a user to obtain selected data concerning selected issuers and securities will be explained. It will be appreciated that display 700 may be created by a processor executing instructions performed by one or more services, obtaining from a catalog location data as to selected data relating to investments, employing the location data to access the selected data relating to investments, transforming the selected data into a common data format, performing operations on the transformed data, and providing an output signal including data for display of the transformed data. Display 700 includes view box 710. View box 710 permits a user to select and name a particular view. A view may include values for filtering data and for determining data categories. Filter box 720 permits a user to select criteria for filtering data from among all available issuers. Users may select variables to include in filtering and values of those variables to employ. Exemplary variables to employ in filtering may include: name of analyst; coverage class; expected performance; exposure of investor or manager to issuer; trends; credit ratings from one or more services; industry classification; possession of material non-public information about the issuer in system; internal portfolio codes; and whether the issuer is on a watch list.

Data selection block 730 permits the user to select data items that the user wishes to see regarding the issuer. Available data items are arranged hierarchically. Users may select greater or lesser detail within categories of data items. After selecting a category, the user may select individual data items. It will be appreciated that view box 710, filter box 720 and data selection block 730 serve to prompt a user to provide selection criteria for issuers and data items. Upon selection of the issuer filter and data items, the user provides an input to cause the system to obtain the requested data items with respect to each of the issuers passing the filter. Responsive to receipt of the user input, a processor may access the catalog and, employing catalog data, access data sources, to obtain the requested data and return the requested data to the user. The returned data may be displayed in the form of a chart 740, for example. The user may request the performance of operations, such as sorting the issuers by any of the data items. Links to data regarding each issuer may be provided. The user may select a link, which provides an indication to a processor to access and return for display additional data relating to the selected issuer.

Referring now to FIG. 8, an issuer event analysis screen 800 with multiple displays of variables against surveillance rules is shown. It will be appreciated that display screen 800 may be created by a processor executing instructions performed by one or more services, obtaining from a catalog location data as to selected data relating to investments, employing the location data to access the selected data relating to investments, transforming the selected data into a common data format, performing operations on the transformed data, and providing an output signal including data for display of the transformed data. A subject value, a reference value, and limits of tolerance of the subject value of a variable may be displayed. Gauge 810 graphically represents a display of a surveillance rule in which the subject value is the current day credit default swap value, a reference value is the prior day credit default swap value; an upper bound tolerance value is 5%, and a lower bound tolerance value is 5%. The subject value is 9% over the reference value and thus over the upper bound tolerance value. A graphic display, in this case a line in red, illustrates that the upper bound has been exceeded and provides a qualitative illustration of the magnitude of the differential between the subject value and the upper bound.

Gauge 812 graphically represents a display of a surveillance rule in which the subject value is the current day credit default swap value, a reference value is the credit default swap value five days earlier; an upper bound tolerance value is 5%, and a lower bound tolerance value is 5%. The subject value is 3% over the reference value and thus within the range of tolerance value. A graphic display shows the entire bar in blue, providing a visual indicator that neither bound has been exceeded; the lack of contrast does not attract the eye of the user.

Gauge 814 graphically represents a display of a surveillance rule in which the subject value is the current day credit default swap value, a reference value is the credit default swap value thirty days earlier; an upper bound tolerance value is 5%, and a lower bound tolerance value is 5%. In this example, the subject value is 4% below the reference value and thus within tolerance. Accordingly, the subject value is graphically shown, but without a difference in color.

Gauge 816 graphically represents a display of a surveillance rule in which the subject value is a current credit rating, a reference value is a prior day's credit rating, and there is no range of tolerance around the reference value. The subject value is BBB−, and the reference value is BB+, thereby providing a subject value with a positive differential outside the tolerance range over the reference value. The difference is displayed graphically in green, a color different from the color for a subject value within tolerance, blue, and different from the color for a subject value negatively outside the tolerance range, red.

Gauge 818 graphically represents a display of a surveillance rule in which the subject value is a current credit rating, a reference value is a prior day's credit rating, and there is no range of tolerance around the reference value. The subject value is BB+, and the reference value is BB−, thereby providing a subject value with a negative differential outside the tolerance range. The difference is displayed graphically in red, thereby differentiating from a subject value within tolerance and a subject value positively outside the tolerance range.

Any suitable reference value may be selected by a user and stored in memory associated with a subject value. For example, a reference value may be based on data associated with selected securities of issuers assigned to the same industry class as the issuer. For a reference value based on a number of data points, such as values of securities associated with a number of issuers, tolerance ranges may be set based on standard deviations from a mean value. For example, a tolerance range may be one or two standard deviations from a mean value.

Users may create settings that are stored in memory and cause a system to provide an alert when a subject values is determined by the system to be outside a tolerance range. A user may create a setting to provide an alert when a subject value is outside a tolerance range in a negative manner. For example, alerts may be provided by the system to the user via e-mail, text message, or other communication. Settings may be provided and stored in memory to cause a system to aggregate all alerts for a particular user for a particular time period, such as a day, and to provide those aggregated alerts in a single communication, such as a single e-mail, or in multiple communications sent at the same time.

In an embodiment, data displayed may be exported to applications, such as spreadsheet tools, e.g., Microsoft Excel, word processing tools, e.g., Microsoft Word, database tools, e.g., Microsoft Access. Applications may provide users with clickable buttons on a user interface that permit selection of data and applications to which data is to be exported. Suitable formatting and field indicators, readable by the selected application, may be provided by a tool called upon user selection of the data and application; such a tool may provide that data in a displayed table is exported to a spreadsheet tool, for example, without loss of organization of the data.

Figure 9:
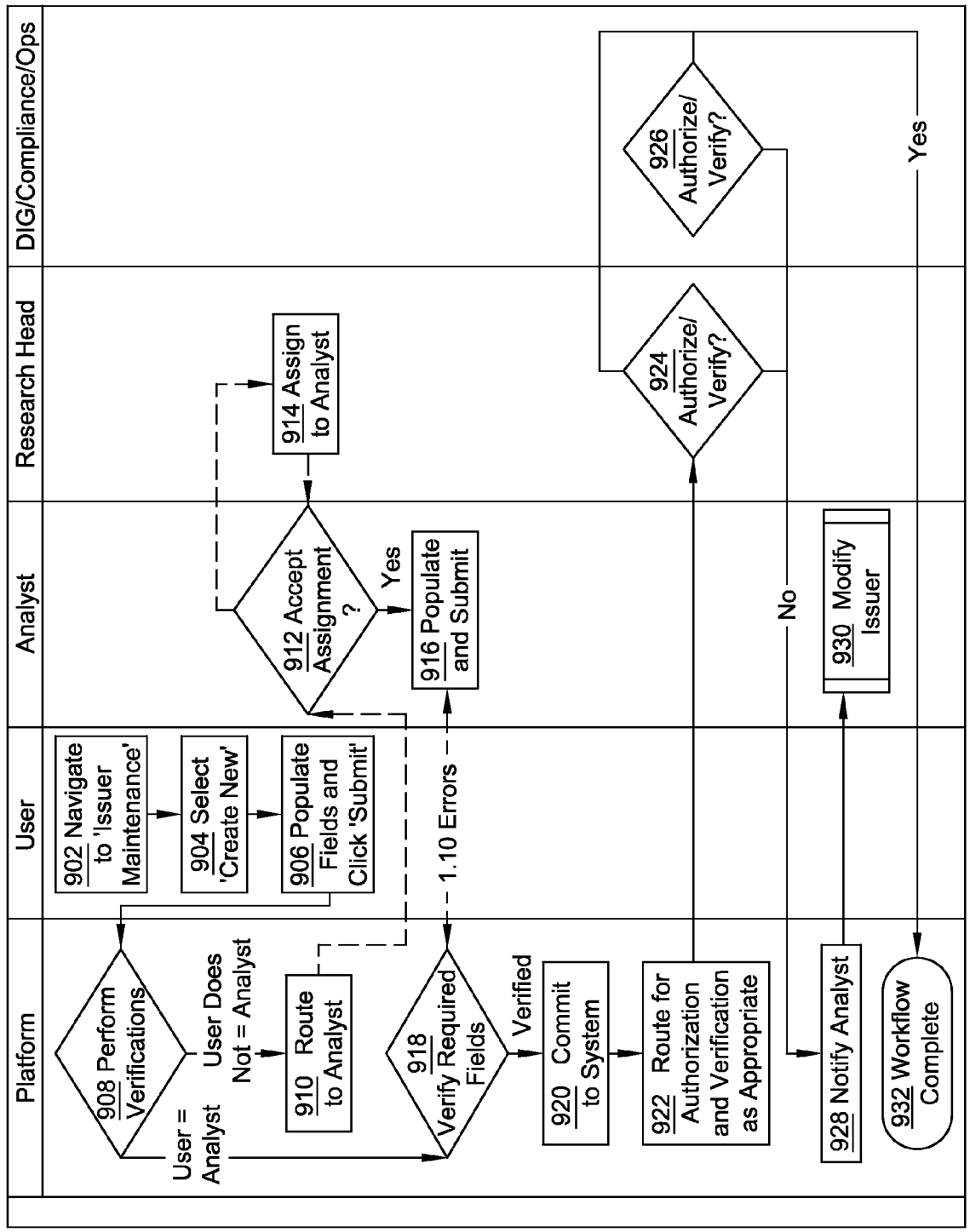
FIG. 9 is process flow diagram of an exemplary process for adding issuers to a system of the invention.

Referring to FIG. 9, which is a process flow diagram for an exemplary process of adding an issuer in a system according to an embodiment of the invention, a process of adding an issuer will be discussed. A user, who may be at a client device having a processor executing instructions contained in a program stored on a computer-readable medium at the client device, selects 902 an issuer maintenance menu from a top level menu. From the issuer maintenance menu, the user selects 904 a create new issuer function. In response to the selection of create new issuer, the client device may prompt the user to input selected information in certain fields; the user populates the fields 906 and clicks a submit button to transfer the data to a platform. The platform functionality may be performed by a processor of a server, such as server 150 of FIG. 1, executing instructions contained in an issuer maintenance program stored on a computer-readable medium at the server. The platform performs verifications 908 on the received data against suitable rules. The platform may return an error message to the client device if the step of verifications indicates errors. The platform determines if the user is an analyst. If the user is not an analyst, the platform routes 910 the request to an analyst. The appropriate analyst may be identified in any suitable manner, such as from a look up table that associates analysts with industry groups, if the fields include an industry group. The analyst, who may be a user employing a client device, is prompted to indicate whether the analyst accepts the assignment to this issuer. If the analyst responds to the prompt by accepting 912 the assignment, the analyst may be prompted with a form with blank fields to populate. If the analyst does not accept the assignment, another system user, such as a research head, may be prompted to assign the new issuer to an analyst. The research head inputs 914 an assignment to an identified analyst from the research head's client device. This assignment may be transmitted to the platform. Responsive to receiving the assignment, the platform may cause the assigned analyst to be given an option to accept the assignment, or may simply proceed. The association of the issuer with the analyst is stored in a system database. If the analyst accepts 912 the assignment, responsive to receipt of the acceptance, the platform may cause the analyst's client device to display a prompt to the analyst to populate fields with data relating to the issuer. The analyst populates 916 the fields and the client device receives the data and submits the data to a platform system. The platform system may verify 918 required fields, such as by accessing and running rules on the data. For example, rules may be provided for completeness of the data regarding the issuer, such as identifications and tickers associated with various issuer data sources, classification as to industry and asset type, and proper user authorization. If errors are detected, the platform may provide a message to the client device to display a prompt for the user to input correct data at the client device, which correct data is then transmitted to the platform. Once no errors are detected, the platform will commit 920 the updated data to the system by updating a database with appropriate fields. The platform then accesses rules relating to system users that are required to provide authorization and/or verification, and routes 922 requests to those system users, such as by e-mail, by messages in system software running on client devices, or through other types of communication. If any user returns a negative response 924, 926 to a request for authorization or verification, the platform notifies 928 the analyst, such as via a message on software running on the analyst's client device. The analyst may then input 930 changes to the issuer data, which changes are then received by the platform and verified; if the changes are correct, the platform returns to seeking authorization/verification.

Figure 10:
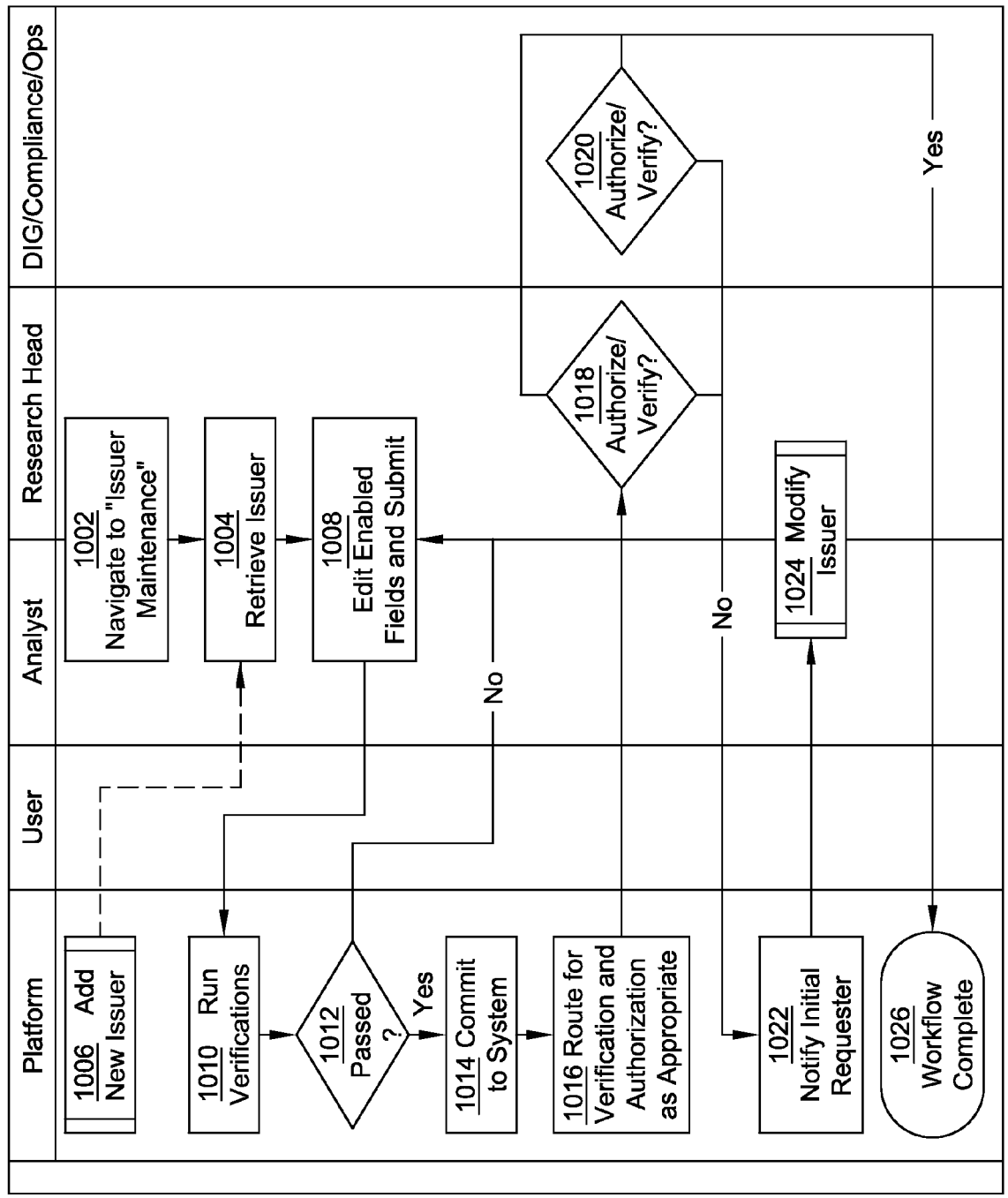
FIG. 10 is a process flow diagram of an exemplary process for modifying issuer information in a system of the invention.

Referring now to FIG. 10, an exemplary method of modifying issuer data in a computer system according to an embodiment will be discussed. Employing an application program at a client device, a user, such as an analyst or a research head who has learned of changes to the issuer, may cause the application program to display 1002 options relating to an issuer maintenance functionality. An issuer is selected and issuer data is retrieved 1004 using the add new issuer functionality 1006 of the platform. Updated data is received at the client device as the analyst or research edits enabled fields and submits the updated data 1008 to the platform. The platform runs verifications, such as various business rules, 1010. If the verifications indicate an error 1012, a suitable message is returned to the client device for the user to further edit fields and resubmit. If no error is indicated, the updated data is committed to the system 1014, but the database is not yet updated. The platform accesses data indicative of users required for verification and routes requests for verification 1016. If the users approve 1018, 1020, then the workflow is complete 1026, and the platform proceeds with updating database data relating to the issuer. If the users do not approve, the platform generates 1022 a notification to the requester, and the modify issuer functionality 1024 may be restarted on the client device.

Figure 11:
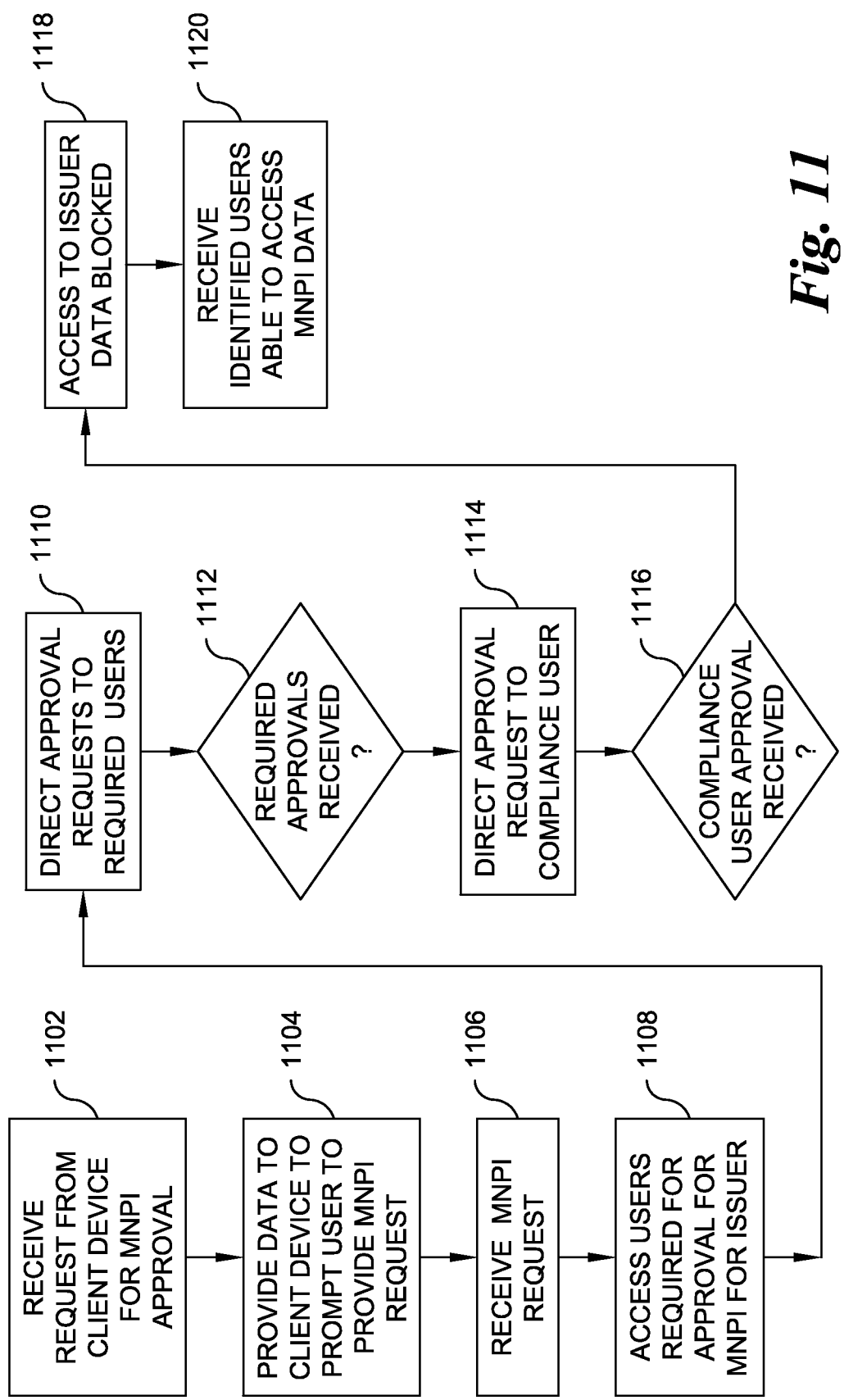
FIG. 11 is a process flow diagram of an exemplary process for associating non-public information with an issuer in a system of the invention.

Referring now to FIG. 11, a method for marking data as material non-public information (MNPI) will be discussed. Data that is marked MNPI is not available to users throughout the system, but only to users specifically approved to obtain that data. A flag may be associated with an issuer to the effect that the system has MNPI with respect to that issuer. A system processor may receive 1102 a request from a client device to incorporate MNPI data in the system. The processor may provide data 1104, such as a web-enabled form or questionnaire, to the client device to prompt the user to provide data required to process the MNPI request. The MNPI request is received 1106 from the client device at the system processor. The system processor accesses 1108 data indicative of users required to approve the request for MNPI for that issuer. The system processor directs 1110 approval requests to those identified required users. If the required approvals are received 1112, then a request for approval is directed 1114 to a compliance user. If approval is received 1116 from the compliance user, then access to the data may be blocked 1118. Users able to review the data may be received 1120, and the MNPI data may be loaded into the system with appropriate flags. If any of the required approvals are not received, the requester may be notified of the lack of approval.

Figure 12:
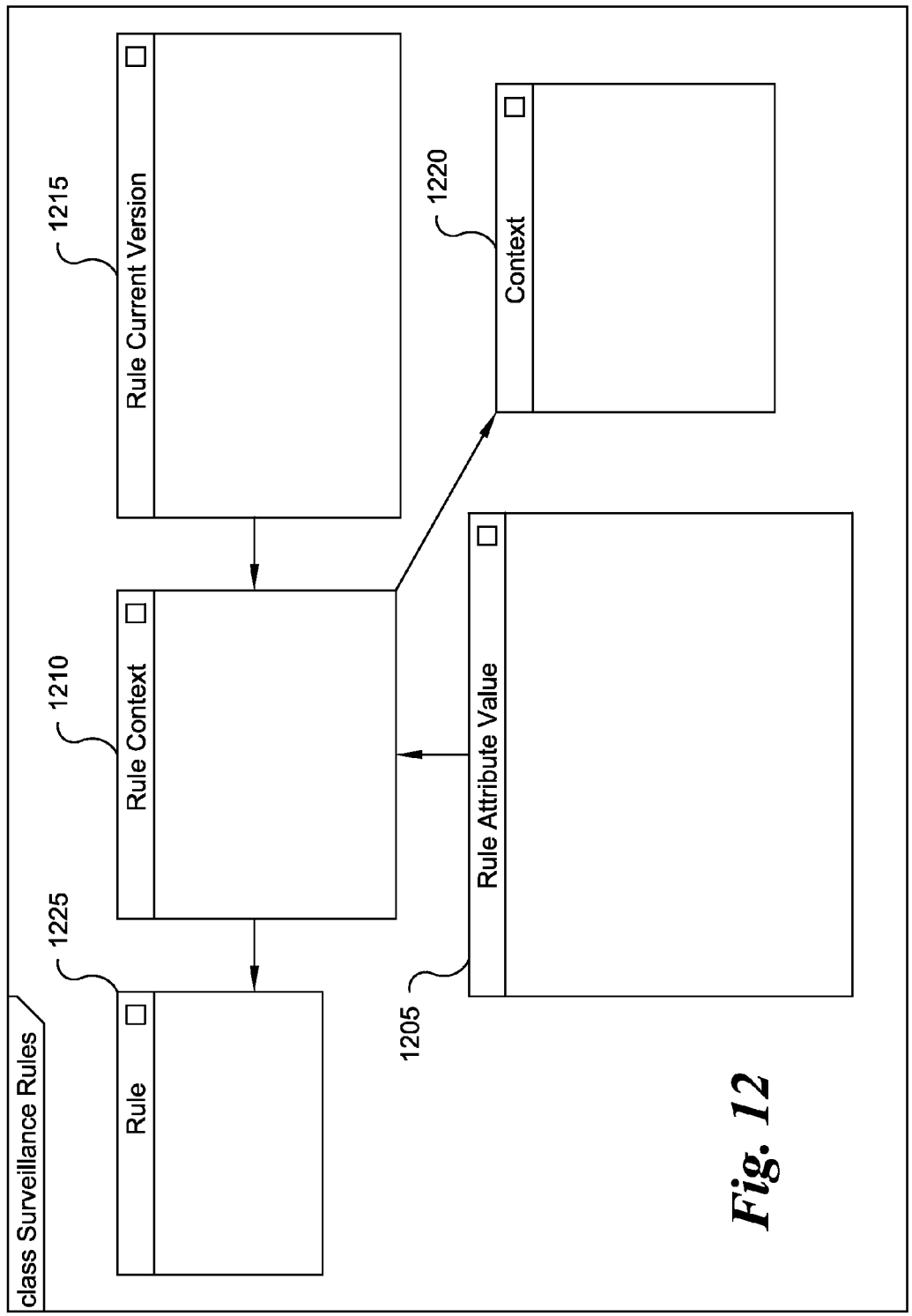
FIG. 12 illustrates data structures associated with surveillance rules in a system of the invention.

Referring now to FIG. 12, an exemplary overall data structures will be explained with respect to surveillance events. Box 1205, labeled rule attribute values, may be populated with data, such as identifications of cohorts of issuers, such as industry groups, to which different tolerance ranges may be applied, may be included. Attribute values may populate are used in rule contexts 1210. Block 1215 may be populated with a current version of a surveillance rule. Block 1220 may provide contexts, such as detail as to user-defined issuer filters to provide, for example, that a particular rule or particular tolerances will apply to issuers having at least a particular investment grade score in one or more industries. Character numbers for rule name and description are provided in box 1225.

Figure 13:
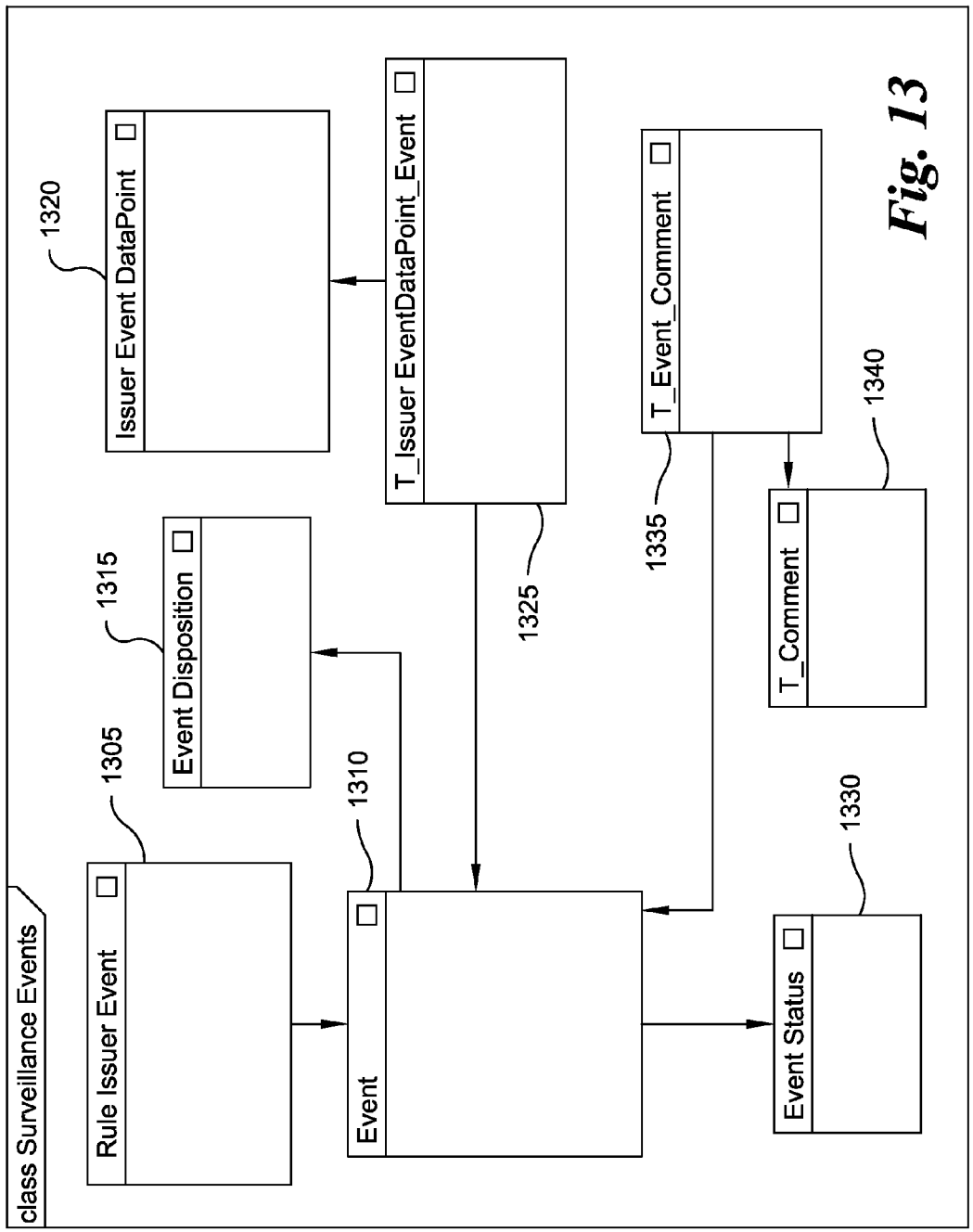
FIG. 13 illustrates data structures associated with surveillance events in a system of the invention.
Figure 14:
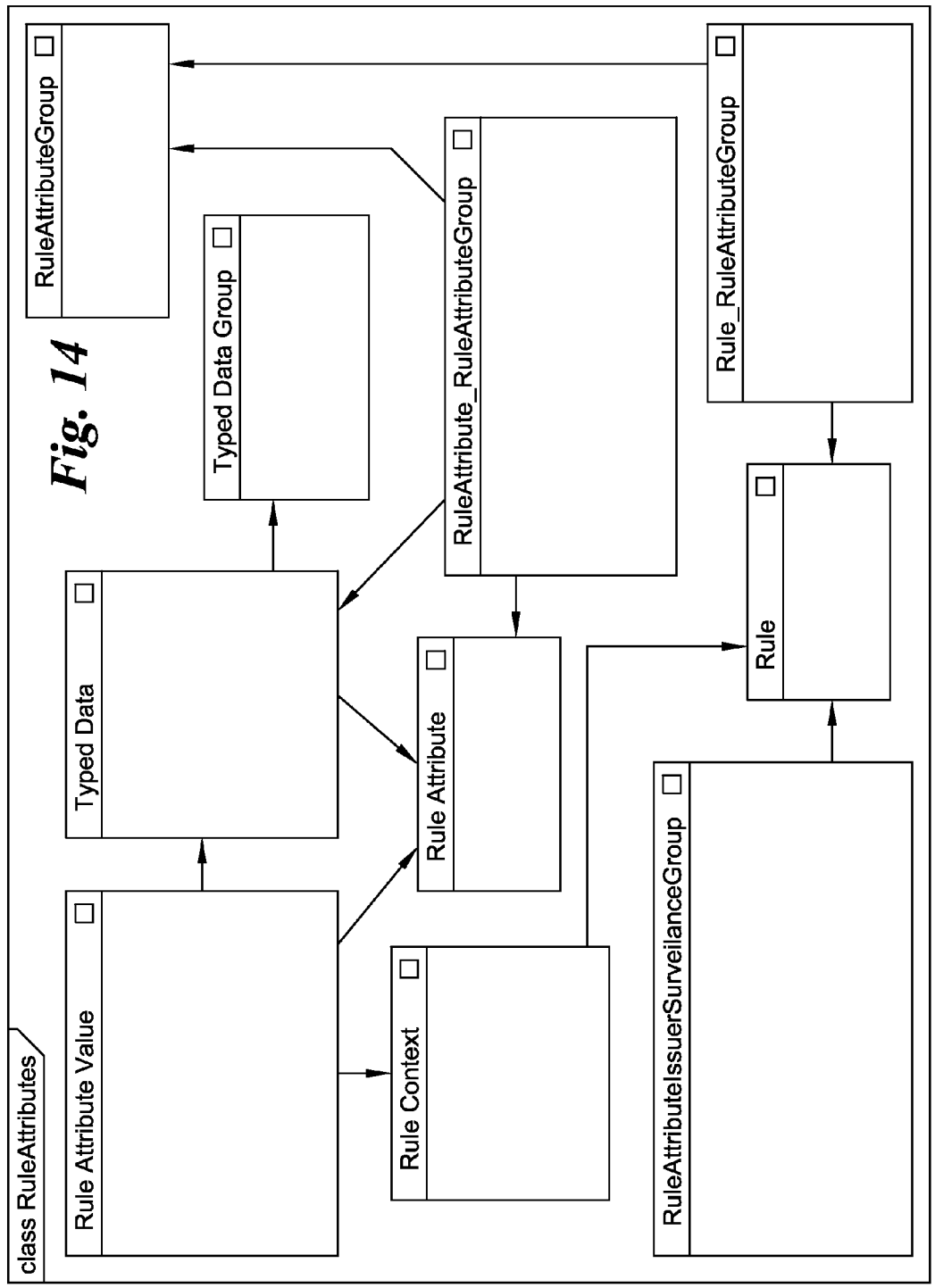
FIG. 14 illustrates data structures associated with rule attributes in a system of the invention.

Referring now to FIG. 13, an exemplary overall structure for data related to surveillance events are shown. In box 1305, the data fields indicate that an event is tied to both a rule and an issuer. Box 1310 may be populated with definitions for metadata related to rules. Box 1315 may indicate an event disposition, such as whether violations of thresholds are coded positive or negative. Box 1320 may identify data point type, such as reference value or subject value. Block 1325 may indicate further data point types. Event status 1330 is derived from event data. Event comment rules 1335 are provided to events 1310, and to comments 1340. FIG. 14 generally shows rule attributes, contexts, and data, and their interrelationship in generating a rule. Rule attributes may include upper and lower thresholds, rule names, reference values, and metadata to drive surveillance of data. Rules permit storage of data in various formats, with relationships between the data in various formats shown.

Figure 15:
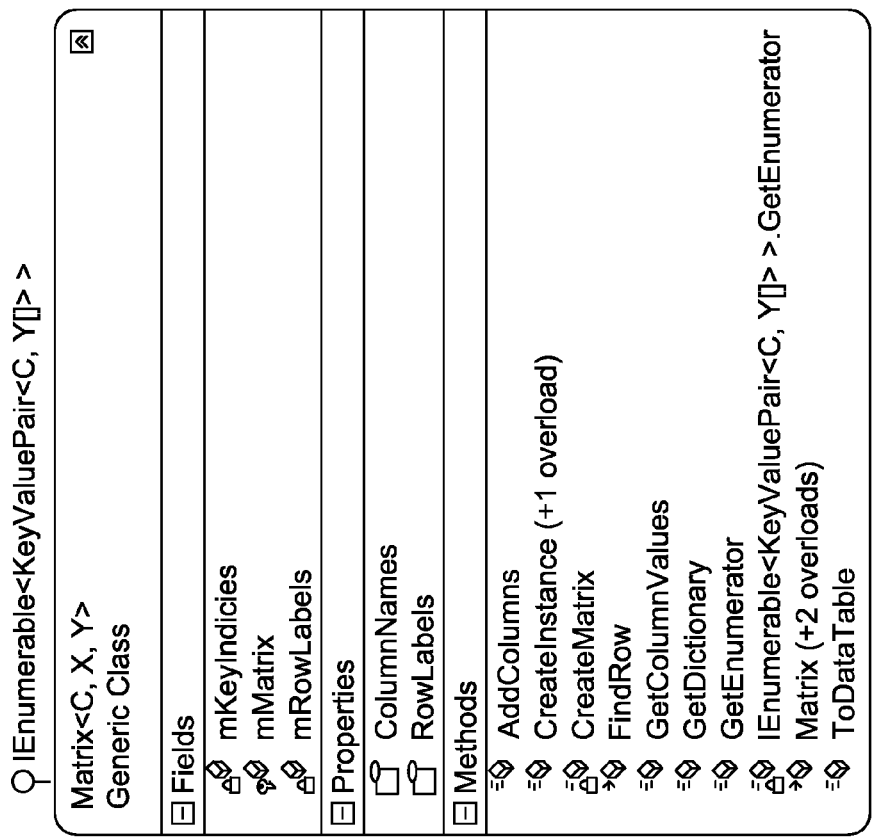
FIG. 15 illustrates a matrix class diagram of an exemplary data format for use in a system of the invention.

Referring to FIG. 15, a matrix class diagram is provided for a common data format. Data may be converted into this common data format by a processor executing instructions included in catalog data services 331 of FIG. 3. The data included in FIG. 15, such as the identified fields, properties and methods, are merely exemplary.

Embodiments of the present invention are operable with computer storage products or computer readable media that contain program code for causing a processor to perform the various computer-implemented operations. The computer-readable medium is any data storage device that can store data which can thereafter be read by a computer system such as a microprocessor. The media and program code may be those specially designed and constructed for the purposes of the present invention, or they may be of the kind well known to those of ordinary skill in the computer software arts. Examples of computer-readable media include, but are not limited to magnetic media such as hard disks, floppy disks, and magnetic tape; optical media such as CD-ROM disks; magneto-optical media; and specially configured hardware devices such as application-specific integrated circuits (ASICs), programmable logic devices (PLDs), and ROM and RAM devices. Examples of program code include both machine code, as produced, for example, by a compiler, or files containing higher-level code that may be executed using an interpreter. Steps in the computer-implemented methods may be implemented in processors running software stored locally, and/or in configurations such as application service providers, in which certain steps are executed on processors communicating with one another over a network such as the Internet. Either stand-alone computers or client/server systems, or any combination thereof, may be employed.

Embodiments of a system and method of the invention may employ browser-based functionality in a modular scheme. In an example, modules of code that provide server controls may take the form of web widgets. The modules of code may be in any suitable format, such as use DHTML, JavaScript, or Adobe Flash. The web widgets may be implemented using Microsoft's Web Parts technology, by way of non-limiting example.

A system in accordance with the invention may include means corresponding to each step in each method described herein. Each means may be implemented by a processor executing instructions contained in programs which may be stored in a storage medium, such as a magnetic or optical storage medium. The instructions may, when executed by a processor, cause the processor to execute algorithms disclosed in association with each step. It will be appreciated that any of the steps in the methods in accordance with the invention described herein may be so implemented.

An exemplary advantage of a system and method in accordance with an embodiment is the ability of analysts and other users of the system to search and have aggregated for them data from a wide variety of sources in a consistent format. Analysts have the ability to associate their research and third party documents with selected items, such as issuers, among investment data, so that other system users will readily obtain that information. Users may set thresholds so as to be notified of events that may be of interest in updating credit analysis and making investment decisions.

While the foregoing invention has been described with reference to the above embodiments, various modifications and changes can be made without departing from the spirit of the invention. Accordingly, all such modifications and changes are considered to be within the scope of the appended claims.

What is claimed is:

1. A computer system for furnishing data relating to securities and issuers of the securities, comprising:
a processor;
one or more memory storage devices, in communication with the processor, storing data relating to the securities and the issuers of the securities; and
an electronic catalog comprising at least catalog data stored in at least one of the one or more memory storage devices, the catalog data comprising at least logical locations for the data relating to the securities and the issuers of the securities;
the processor being configured to:
access, using at least the catalog data, the data relating to the securities and the issuers of the securities; and
process the accessed data relating to the securities and the issuers of the securities and output for display data including a listing of issuers and, associated with each issuer in the listing, one or more criteria and a result of application of a surveillance rule to each of the one or more criteria.

2. The computer system of claim 1, wherein the processor is further configured to output data for representation of the result of application of the surveillance rule graphically in color.

3. The computer system of claim 1, wherein the processor is further configured to, responsive to receipt of a prompt to display only those issuers having an exception included in the result of application of the surveillance rule, output data for display of data for only those issuers having at least one exception included in the result of application of the surveillance rule.

4. The computer system of claim 1, wherein the processor is further configured to receive an indication of review and closure of an exception in the application of the surveillance rule, and responsive to receipt of the indication, output data for graphic display in association with the issuer and the surveillance rule an indication of a reviewed exception.

5. The computer system of claim 1, wherein the processor is further configured to output data for graphic representation of, for one or more of the criteria, a subject value, a reference value, and a limit of tolerance of the subject value.

6. The computer system of claim 5, wherein the reference value is a value of the subject value at a prior time.

7. The computer system of claim 6, wherein the subject value is a current credit default swap value and the reference value is a prior day credit default swap value.

8. The computer system of claim 6, wherein the subject value is a credit rating of an issuer and the reference value is a prior day credit rating of the issuer.

9. The computer system of claim 5, wherein the processor is further configured to receive a reference value determined by a user and based on data associated with selected securities of issuers assigned to a same industry class as an issuer, and to output data indicative of a result of comparison of the subject value to the user-determined reference value.

10. The computer system of claim 5, wherein the processor is further configured to output data for representation of the subject value in a first color when within the limit of tolerance and in a second color when outside the limit of tolerance.

11. A computer-implemented method for furnishing data relating to securities and issuers of the securities, comprising:
storing in one or more memory storage devices data relating to the securities and the issuers of the securities;
storing in the one or more memory storage devices catalog data comprising at least logical locations for the data relating to the securities and the issuers of the securities;
accessing by one or more processors, using at least the catalog data, the data relating to the securities and the issuers of the securities; and
processing by the one or more processors the accessed data relating to the securities and the issuers of the securities and outputting by the one or more processors for display data including a listing of issuers and, associated with each issuer in the listing, one or more criteria and a result of application of a surveillance rule to each of the one or more criteria.

12. The computer-implemented method of claim 11, further comprising outputting data for display of a graphic indicative of unavailability of data to determine the result of application of the surveillance rule.

13. The computer-implemented method of claim 11, further comprising receiving a user selection of a risk class, and outputting for display in the listing data relating only to issuers in the user-selected risk class.

14. The computer-implemented method of claim 11, wherein the criteria comprise data indicative of variations in credit default swap values for a plurality of periods.

15. The computer-implemented method of claim 14, wherein the data indicative of variations in credit default swap values comprise credit default swap 1 day variation, credit default swap 5 day variation and credit default swap 30 day variation.

16. The computer-implemented method of claim 11, further comprising receiving a user-defined setting to provide an alert when a subject value is outside a tolerance range in a negative manner, and, responsive to determining that the subject value is outside the tolerance range in the negative manner, providing an alert via at least one of e-mail or text message.

17. A non-transitory computer-readable medium having a plurality of instructions thereon for furnishing data relating to investments, which instructions, when executed by a processor, cause the processor to:
access an electronic catalog comprising at least catalog data stored in one or more memory storage devices, the catalog data comprising at least logical locations for the data relating to investments;
employ location data accessed from the catalog to access selected data of the data relating to investments stored in a plurality of formats in one or more memory storage devices; and
process the accessed data relating to the securities and the issuers of the securities and output for display data including a listing of issuers and, associated with each issuer in the listing, one or more criteria and a result of application of a surveillance rule to each of the one or more criteria.

18. The non-transitory computer-readable medium of claim 17, wherein the instructions further cause the processor to output for graphic representation, for at least some of the criteria, a subject value, a reference value, and negative and positive limits of tolerance of the subject value.

19. The non-transitory computer-readable medium of claim 18, wherein the instructions further cause the processor to output data for representation of the subject value in a first color for a value within the limits of tolerance, a second color for a value exceeding the negative limit of tolerance, and a third color for a value exceeding the positive limit of tolerance.

20. The non-transitory computer-readable medium of claim 19, wherein the subject value is a current credit rating.

* * * * *